(12) United States Patent
Farrell et al.

(10) Patent No.: US 9,756,668 B2
(45) Date of Patent: Sep. 5, 2017

(54) COMMUNICATION SYSTEMS AND METHODS FOR FLEXIBLE TELEMATICS AT A VEHICLE

(71) Applicant: Sirius XM Connected Vehicle Services Inc., Irving, TX (US)

(72) Inventors: Tod Farrell, Coppell, TX (US); Robert Orson Ellingson, Grapevine, TX (US); Sammy Halimi, Carrollton, TX (US); Craig George Kenneth Copland, Rowley, MA (US)

(73) Assignee: Sirius XM Connected Vehicle Services Inc., Irving, TX (US)

( * ) Notice: Subject to any disclaimer, the term of this patent is extended or adjusted under 35 U.S.C. 154(b) by 0 days.

(21) Appl. No.: 15/097,214

(22) Filed: Apr. 12, 2016

(65) Prior Publication Data
US 2016/0227375 A1 Aug. 4, 2016

Related U.S. Application Data

(63) Continuation of application No. 14/698,710, filed on Apr. 28, 2015, now Pat. No. 9,549,425, which is a
(Continued)

(51) Int. Cl.
*H04W 4/00* (2009.01)
*H04W 76/02* (2009.01)
(Continued)

(52) U.S. Cl.
CPC .......... *H04W 76/021* (2013.01); *G08G 1/205* (2013.01); *H04L 67/12* (2013.01);
(Continued)

(58) Field of Classification Search
CPC ..... H04W 76/021; H04W 4/14; H04W 4/008; H04W 76/023; H04W 4/027;
(Continued)

(56) References Cited

U.S. PATENT DOCUMENTS 7,006,831 B2    2/2006  Matz et al.
7,366,892 B2    4/2008  Spaur et al.
(Continued)

OTHER PUBLICATIONS

International Search Report of PCT/US/42906 Dated Sep. 14, 2012.

*Primary Examiner* — Amancio Gonzalez
(74) *Attorney, Agent, or Firm* — Mayback & Hoffman, P.A.; Gregory L. Mayback

(57) ABSTRACT

A system for allocating communications resources for telematics communications includes a service provider, a gateway, a currently paired mobile device having at least first and second communications channels through which communication occurs to the service provider, sensing speed or acceleration of the mobile device based on internal data, detecting changes in speed or acceleration based upon the internal data, and determining that an event notification is to be sent to the service provider based upon the detected change in the speed or acceleration. A telematics device has at least a third communications channel through which communication occurs to the service provider. The telematics device and/or the mobile device determines which of the first, second, and third communications channels is to be used to communicate to the service provider and the respective one of the telematics device and the mobile device sends the event notification to the service provider.

15 Claims, 12 Drawing Sheets

Related U.S. Application Data continuation of application No. 13/524,733, filed on Jun. 15, 2012, now Pat. No. 9,047,783, which is a continuation-in-part of application No. 12/363,267, filed on Jan. 30, 2009, now Pat. No. 8,626,152, and a continuation-in-part of application No. 13/033,185, filed on Feb. 23, 2011, now Pat. No. 8,768,345, and a continuation-in-part of application No. 13/033,167, filed on Feb. 23, 2011, now Pat. No. 8,818,358, and a continuation-in-part of application No. 13/033,112, filed on Feb. 23, 2011, now Pat. No. 8,798,616, and a continuation-in-part of application No. 13/033,083, filed on Feb. 23, 2011, now Pat. No. 8,761,758, and a continuation-in-part of application No. 13/033,046, filed on Feb. 23, 2011, now Pat. No. 8,774,794, said application No. 14/698,710 is a continuation-in-part of application No. 14/274,019, filed on May 9, 2014, now Pat. No. 9,401,978, application No. 15/097,214, which is a continuation-in-part of application No. 14/274,019, filed on May 9, 2014, now Pat. No. 9,401,978.

(60) Provisional application No. 61/497,715, filed on Jun. 16, 2011, provisional application No. 61/024,956, filed on Jan. 31, 2008.

(51) Int. Cl.
  *G08G 1/00*          (2006.01)
  *H04M 1/60*          (2006.01)
  *H04W 4/02*          (2009.01)
  *H04W 72/04*         (2009.01)
  *H04L 29/08*         (2006.01)
  *H04W 4/14*          (2009.01)
  *H04W 84/18*         (2009.01)

(52) U.S. Cl.
  CPC ......... *H04M 1/6091* (2013.01); *H04W 4/008* (2013.01); *H04W 4/027* (2013.01); *H04W 4/14* (2013.01); *H04W 72/048* (2013.01); *H04W 76/023* (2013.01); *H04M 2250/02* (2013.01); *H04M 2250/10* (2013.01); *H04W 76/02* (2013.01); *H04W 84/18* (2013.01)

(58) Field of Classification Search
  CPC ... H04W 72/048; H04W 84/18; H04W 76/02; H04L 67/12; H04M 1/6091; H04M 2250/10; H04M 2250/02; G08G 1/205
  USPC ................. 455/426.1, 41.2, 569.2; 707/104.1
  See application file for complete search history.

(56) References Cited

U.S. PATENT DOCUMENTS

| | | |
|---|---|---|
| 7,532,880 B2 | 5/2009 | Mazzara |
| 7,599,680 B2 | 10/2009 | Patenaude et al. |
| 7,782,356 B2 | 8/2010 | Nou |
| 2010/0030887 A1 | 2/2010 | Mousseau et al. |

COMMUNICATION SYSTEMS AND METHODS FOR FLEXIBLE TELEMATICS AT A VEHICLE

CROSS-REFERENCE TO RELATED APPLICATIONS

This application:
is a continuation of U.S. patent application Ser. No. 14/698,710, filed on Apr. 28, 2015, which application:
is a continuation of U.S. patent application Ser. No. 13/524,733, filed on Jun. 15, 2012, now U.S. Pat. No. 9,047,783 issued Jun. 2, 2015, which application:
claims the priority, under 35 U.S.C. §119, of U.S. Provisional Application No. 61/497,715, filed on Jun. 16, 2011;
is a continuation-in-part of U.S. patent application Ser. No. 12/363,267, filed on Jan. 30, 2009, now U.S. Pat. No. 8,626,152, issued on Jan. 7, 2014, which application:
claims the priority, under 35 U.S.C. §119, of U.S. Provisional Patent Application No. 61/024,956, filed on Jan. 31, 2008;
is a continuation-in-part application of U.S. patent application Ser. No. 13/033,185, filed Feb. 23, 2011, now U.S. Pat. No. 8,768,345, issued Jul. 1, 2014;
is a continuation-in-part of U.S. patent application Ser. No. 13/033,167, filed Feb. 23, 2011, now U.S. Pat. No. 8,818,358, issued Aug. 26, 2014;
is a continuation-in-part of U.S. patent application Ser. No. 13/033,112, filed Feb. 23, 2011, now U.S. Pat. No. 8,798,616, issued Aug. 5, 2014;
is a continuation-in-part of U.S. patent application Ser. No. 13/033,083, filed Feb. 23, 2011, now U.S. Pat. No. 8,761,758, issued Jun. 24, 2014;
is a continuation-in-part of U.S. patent application Ser. No. 13/033,046, filed Feb. 23, 2011, now U.S. Pat. No. 8,774,794, issued Jul. 8, 2014; and
is a continuation-in-part of U.S. patent application Ser. No. 14/274,019, filed on May 9, 2014, now U.S. Pat. No. 9,401,978, issued on Jul. 26, 2016; and
is a continuation-in-part application of U.S. patent application Ser. No. 14/274,019, filed May 9, 2014, now U.S. Pat. No. 9,401,978, issued on Jul. 26, 2016,
the entire disclosures of all of the above-listed applications are hereby incorporated herein by reference in their entireties.

STATEMENT REGARDING FEDERALLY SPONSORED RESEARCH OR DEVELOPMENT n/a

FIELD OF THE INVENTION

The present invention relates generally to providing a telematics system in a vehicle that has not previously been set up for such a system. More specifically, the present invention relates to a simplified telematics system for use in a new vehicle at a manufacturing site, or as a retrofitted telematics system to an existing vehicle, and methods for providing such telematics to a vehicle. The present invention further relates to systems and processes for communication between the vehicle and a remote data center.

BACKGROUND OF THE INVENTION

As consumer vehicles, such as cars and trucks, become more technologically complicated, operation of that vehicle becomes even more difficult. Today there is such an array of devices in trucks and cars that driver distraction is a major problem. To ease the driver's burden, mobile telematics systems and services have evolved that integrate wireless communications and (usually) location determining devices into vehicles to perform a number of tasks including, for example, carrying out remote engine diagnostics, locating stolen vehicles, and providing roadside assistance. Integration of such telematics systems requires significant design and implementation costs, not to mention the costly hardware that needs to be installed in the vehicle. Even though some manufacturers have started to include telematics systems with new vehicles, most new vehicles on the road today do not have such systems. More importantly, most manufacturers do not design vehicles to house such complex technology. When the manufacturers do incorporate this technology, it requires extra wiring and complexity. Thus, a need exists to make simpler systems both for installation at the site of manufacturing and retrofitting into existing vehicles without having to modify the vehicle in any substantial way (whether in terms of cost or labor).

While most vehicles do not have telematics systems pre-installed, many vehicles do have other kinds of integrated electronic communication devices. One kind of communications device that can be found in some vehicles is a Bluetooth transceiver. Bluetooth is an industrial specification for wireless personal area networks (PANs). A Bluetooth gateway provides measures for connection and exchanging information between devices such as mobile phones, laptops, PCs, printers, digital cameras, and video game consoles over a secure, globally unlicensed short-range radio frequency. Equipping vehicles with a Bluetooth transceiver (also referred to as a Bluetooth gateway) makes it possible to link the vehicle with other Bluetooth-compatible devices brought into or near the car, the most common of which is a Bluetooth-compatible cell phone.

When a Bluetooth-compatible cell phone is brought into a vehicle equipped with a Bluetooth transceiver, a data link is created between the phone and the transceiver. The most common feature made available to owners of vehicles so equipped is the ability to talk on the cell phone in a hands-free manner. In this embodiment, the vehicle is provided with a microphone (at least one near or directed at the head of the driver) for receiving audio from at least the driver (and, possibly, any passenger within the vehicle). A speaker system commonly associated with a vehicle's radio is temporarily connected to the transceiver and is, thereby, used to present any received audio signals to the user. Of course, dedicated speakers can be provided in the vehicle for this function or even a combination of these exemplary configurations. With such a configuration, bi-directional audio communication is made available to occupants of the vehicle.

Another common Bluetooth feature is the ability to display and/or use the phone list stored in the cell phone for making calls without having to touch the cell phone. Either the vehicle is provided with a voice-recognition system to select a particular number in the cell phone's phone number list or has mechanical controls for doing so, or both. Such systems, however, do not have the ability to expand beyond these limited functions.

There exists a need to be able to provide a simplified, cost-effective telematics system to be used both by original equipment manufacturers for new vehicle installations and by owners of existing vehicles for retrofitting into vehicles only having a Bluetooth transceiver without having to modify the vehicle in any substantial way (whether in terms of cost or labor). Even with the advent of telematics systems in vehicles today, there is not currently a service that is deployed to solve the above-described problems. Thus, it would be a significant advancement in the art to provide a telematics system in a vehicle where one did not exist before and where the vehicle was not pre-configured to provide such features.

SUMMARY OF THE INVENTION

Briefly, in accordance with the present invention, disclosed is a device and method for simplifying manufacturer-fitted telematics systems and retrofitting a telematics communication and control unit in a vehicle configured with a Bluetooth transceiver. This system and its process makes use of existing, in-vehicle Bluetooth gateways (in one embodiment, referred to as a "Sync Box") by adding a component that contains all needed additional hardware for carrying out the desired telematics functions, for example, a positioning module (e.g., GPS) and a data module. The data module can be a phone with voice capability, but it can also be merely a data modem. Software is also added. Each vehicle equipped with Bluetooth communications capabilities has a Bluetooth gateway with particular characteristics, which can be obtained from the vehicle's manufacturer. A vehicle-specific software application is added to the Bluetooth gateway. In this way, the inventive telematics component (also referred to as a telematics gateway) can be linked to user interfaces of the vehicle through the Bluetooth gateway. This link is achieved through the standard Bluetooth PAN. This software application contains appropriate logic for activation of the telematics component.

While it is known to use vehicle interfaces to receive and transmit audio phone calls through a vehicle's Bluetooth gateway, this gateway has not been used with data-oriented telematics functions. Where, for example, the phone does not have service available for communicating audio phone calls, the present invention still allows telematics functionality in a vehicle through use of the inventive data-oriented communication system. Moreover, the present invention provides this functionality as a retro-fitting system. Thus, the present invention permits, for the first time, telematics functionality in a vehicle without requiring the vehicle manufacturer to pre-design and pre-install such functionality. Now that the vehicle has the new ability to communicate via voice, text, and packet data, the invention further provides various methods and systems to control and route these communications.

In prior-art vehicle telematics components, a dedicated bi-directional voice communications link was required. This link was provided by including an integrated device containing the same functionality as a standard cellular phone. Concomitantly, charges for this link were incurred and were at a level comparable to a consumer's pre-existing portable cell phone. Such systems, therefore, caused the consumer to pay approximately double fees for these two cellular devices.

In contrast, the present invention entirely eliminates the need for a bi-directional, voice-supporting cellular device to be included in the telematics component. Instead, the telematics component of the present invention needs only to have a data transceiver, also referred to as a data pump. The telematics component can carry out all external data communication through this data pump. More specifically, when a user enters a vehicle with a Bluetooth-compatible device, the Bluetooth system sets up a communications link between the system and the device. This device can be already recognized (where it has been coupled with this system in the past) or it can be new to the system (in which case, a recognition protocol between the system and the device is carried out). The Bluetooth system stores information about each such device in a client stack, in which each such device is uniquely identified and recorded. The Bluetooth system is, then, able to direct data to, from, and through each such device in parallel or by multiplexing. The telematics component of the present invention utilizes this information and connection to communicate outside the vehicle for voice. For example, if a request for information is transmitted out from the telematics component, the path for such a communication will be between the data pump and the Bluetooth system, which data pump is capable of sending out the query data and receiving back the answer data. By knowing which devices are paired, the telematics component can embed the unique calling identifier (e.g., the cellular phone number) within the transmitted data. Then, when the off-site telematics information provider responds to the query, the response is channeled automatically through the paired device. The transaction can be entirely non-voice, in which the user is entirely unaware that their data pump was used for this telematics request, or can include (partially or wholly) voice data. In the latter case, the user's phone will ring, just as receiving a phone call, and the voice response from the telematics operator (whether automated, recorded or live) is conveyed to the vehicle user. In an alternative exemplary embodiment, the telematics component does not embed the unique calling identifier and calls a particular pre-programmed cell phone that is set by the system or the user to receive a call when a given event occurs.

If there is a reason to originate data from a telematics operator to the vehicle or an occupant of the vehicle, the data is sent through the data pump. Then, when a mobile terminated communication occurs (i.e., to the vehicle), each of these paired devices is polled to determine if they are currently paired with the telematics component. When such a query returns a positive result, the data can be communicated (e.g., displayed) to the current user through one of the currently paired devices.

Thus, the present invention entirely eliminates the need for a voice-capable cellular device to be included with the telematics component. By utilizing the vehicle's Bluetooth gateway, the present invention can take hold, temporarily, of the consumer's portable cell phone to carry out the needed telematics voice communication, resulting in a significant cost savings.

The invention provides a simplified manufacturer's install or retrofitting telematics system and method for providing telematics to a vehicle that overcome the hereinafore-mentioned disadvantages of the heretofore-known devices and methods of this general type and that provides a telematics system in a vehicle that has not previously been set up for such a system.

With the foregoing and other objects in view, there is provided, in accordance with the invention, a method for providing telematics to a vehicle includes the step of providing a user-removable telematics component with a Global Positioning System (GPS) device, a data pump, and a short range wireless personal area network transceiver, communicatively connecting the telematics component to an integrated communication device of the vehicle, the integrated communication device having a short range wireless personal area network transceiver and a memory storing a list that includes at least a phone number of at least one currently paired mobile communication device, periodically receiving at the data pump at least a portion of the list, the portion of the list including the phone number of the at least one currently paired mobile communication device, and periodically transmitting the portion of the list out from the telematics component to an off-site telematics provider utilizing a communications path of the data pump.

In accordance with a further mode of the invention, a request for assistance is received at an off-site telematics provider and, in response to receiving the request, a communication link is opened directly between the off-site telematics provider and the at least one currently paired mobile communication device.

In accordance with an added mode of the invention, the step of opening a communication link is carried out by at least one of dialing the phone number of the at least one currently paired mobile communication device and sending a text to the at least one currently paired mobile communication device.

In accordance with an additional mode of the invention, the communication link is at least one of a data-only communications link and a voice communications link.

In accordance with yet another mode of the invention, the communications path of the data pump is selected from at least one of a communications path from the data pump to the integrated communication device of the vehicle and from the integrated communication device of the vehicle through the at least one currently paired mobile communication device, a communications path from the data pump, through the short range wireless personal area network transceiver of the telematics component, and through the at least one currently paired mobile communication device, a communications path from the data pump, through the short range wireless personal area network transceiver of the telematics component, through the short range wireless personal area network transceiver of the integrated communication device, and through the at least one currently paired mobile communication device, and a direct communications path between the data pump and the off-site telematics provider.

In accordance with yet a further mode of the invention, the periodic transmitting step is carried out by transmitting the portion of the list out from the telematics component utilizing a communications path selected from at least one of a communications path from the data pump to the integrated communication device of the vehicle and from the integrated communication device of the vehicle through the at least one currently paired mobile communication device to the off-site telematics provider, a communications path from the data pump through the short range wireless personal area network transceiver of the telematics component and the at least one currently paired mobile communication device to the off-site telematics provider, a communications path from the data pump, through the short range wireless personal area network transceiver of the telematics component, through the short range wireless personal area network transceiver of the integrated communication device, and through the at least one currently paired mobile communication device to the off-site telematics provider, and a direct communications path between the data pump and the off-site telematics provider.

In accordance with yet an added mode of the invention, the periodically receiving and periodically transmitting steps is carried out at a time when a service is requested and/or when the off-site telematics provider requests the list.

In accordance with yet an additional mode of the invention, the periodically receiving and periodically transmitting steps are carried out on defined periods and/or on randomly sized periods.

In accordance with again another mode of the invention, the list further includes a phone number of at least one of a previously paired mobile communication device, a predefined mobile communication device, all phones ever configured for pairing with the telematics component, and all phones currently paired with the telematics component.

In accordance with again a further mode of the invention, a request for assistance is received at an off-site telematics provider and, in response to receiving the request, a communication link is opened directly between the off-site telematics provider and at least one of the at least one currently paired mobile communication device, the previously paired mobile communication device, and the predefined mobile communication device.

In accordance with again an added mode of the invention, the telematics component has a device programmed to indicate all phones currently paired with the telematics component, indicate when any phone was last paired with the telematics component, and indicate at least one of a received signal strength, battery data, and a data pump signal strength for all phones currently paired with the telematics component.

In accordance with again an additional mode of the invention, a voice communications path is opened from the off-site telematics provider to a previously registered contact number outside the vehicle and connecting a previously registered contact number outside the vehicle to the vehicle.

In accordance with still another mode of the invention, a request for assistance is received at an off-site telematics provider and, in response to receiving the request, a voice communications path is opened by the off-site telematics provider between a previously registered contact number outside the vehicle and at least one currently paired mobile communication device.

In accordance with still a further mode of the invention, prior to opening the voice communication path, an automated message is provided to at least one of the previously registered contact number outside the vehicle and the at least one currently paired mobile communication device.

In accordance with still an added mode of the invention, a request for assistance is received at an off-site telematics provider and, in response to receiving the request, a voice communications path is opened between the at least one currently paired mobile communication device and the off-site telematics provider and between a previously registered contact number outside the vehicle and the off-site telematics provider.

In accordance with still an additional mode of the invention, prior to opening the voice communication path, an automated message is provided to at least one of the previously registered contact number outside the vehicle and the at least one currently paired mobile communication device.

In accordance with another mode of the invention, the list includes at least one of all phones configured for pairing with the telematics component and indicia indicating which of the phones are currently paired, all phones configured for pairing with the telematics component and indicia indicating when each of the phones was last paired, a currently paired phone and indicia indicating the received signal strength of the currently paired phone, battery information of the currently paired phone, and signal strength of the data pump, and a currently paired phone and indicia indicating the received signal strength of the currently paired phone and the signal strength of the data pump.

In accordance with a further mode of the invention, a request for assistance is received at an off-site telematics provider and, in response to receiving the request, a voice communications path is opened between a previously registered contact number outside the vehicle as indicated by the off-site telematics provider and at least one currently paired mobile communication device.

In accordance with a further mode of the invention, the short range wireless personal area network transceiver is a Bluetooth transceiver.

With the foregoing and other objects in view, there is provided, a system for allocating communications resources for telematics communications including a service provider, a gateway, a currently paired mobile communication device having at least first and second communications channels through which communication occurs to the service provider, sensing at least one of speed and acceleration of the mobile communication device based on internally provided data, detecting changes in at least one the speed and the acceleration of the mobile communication device based upon the sensing of the at least one of speed and acceleration by the internally provided data, and determining that an event notification is to be sent to the service provider based upon the detected change in the at least one of the speed and the acceleration, and a telematics device having at least a third communications channel through which communication occurs to the service provider, at least one of the telematics device and the currently paired mobile communication device determining which of the first, second, and third communications channels is to be used to communicate to the service provider and the respective one of the telematics device and the currently paired mobile communication device sending the event notification to the service provider.

With the objects in view, the service provider is a remote data center.

In accordance with another feature, there is provided a vehicle in which the gateway and the telematics device are installed.

In accordance with a further feature, the gateway is an in-vehicle mobile-communication-pairing device.

In accordance with an added feature, the mobile communication device is a cell phone having at least one of a GPS location system and an accelerometer and sensing the at least one of the speed and the acceleration of the cell phone based on data from at least one of the GPS location system and the accelerometer.

In accordance with an additional feature, the cell phone communicates with the gateway, the gateway communicates with the telematics device, and the cell phone passes the event notification to the telematics device through the gateway.

In accordance with yet another feature, the gateway recognizes the event notification from the cell phone as a crash of the vehicle.

In accordance with yet a further feature, the first communication channel is a voice channel, the second communication channel is a data channel associated with a consumer data plan, the third communication channel is a data channel associated with a dedicated data plan, and the third communication channel increases security and likelihood of a successful transmission of the event notification to the service provider.

In accordance with yet an added feature, the telematics device initiated a telematics communication between the telematics device and the service provider through the first communication channel of the cell phone, the telematics communication including the event notification.

In accordance with yet an additional feature, the telematics device initiated a telematics communication between the telematics device and the service provider through the second communication channel of the cell phone, the telematics communication including the event notification.

In accordance with again another feature, the telematics device initiated a telematics communication between the telematics device and the service provider through the third communication channel, the telematics communication including the event notification.

In accordance with again a further feature, the cell phone instructs the telematics device to initiate a telematics communication between the telematics device and the service provider through the third communication channel, the telematics communication including the event notification.

In accordance with again an added feature, the cell phone sends the event notification to the service provider through the first communication channel of the cell phone.

In accordance with again an additional feature, the cell phone sends the event notification to the service provider through the second communication channel of the cell phone.

In accordance with a concomitant feature, the telematics device initiates a telematics communication between the telematics device and the service provider via a network, determines whether a network resource allocation for the telematics communication is still required based upon user intent information, and sends a notification of a change in the network resource allocation via a secondary communication channel, the secondary communication channel comprising one of a first link coupled to the gateway, a second link coupled to the telematics device, and a third link coupled to the currently paired mobile communication device.

With the objects of the invention in view, there is also provided a system for allocating communications resources for telematics communications. The system includes a service provider, a gateway, and a telematics device. The telematics device: initiates a telematics communication between the telematics device and the service provider via a network; determines whether a network resource allocation for the telematics communication is still required based upon user intent information; and sends a notification of a change in the network resource allocation via a secondary communication channel. The secondary communication channel can be one of a first link coupled to the gateway and a second link coupled to the telematics device.

In accordance with another feature of the invention, the change in the network resource allocation is attributable to a cancellation.

In accordance with a further feature of the invention, the change in the network resource allocation is attributable to an upgrade.

In accordance with an added feature of the invention, the change in the network resource allocation is attributable to a request alteration.

In accordance with an additional feature of the invention, the change in the network resource allocation is a call redirection due to an upgrade where there is no network acknowledgement.

In accordance with yet another feature of the invention, the change in the network resource allocation is a call cancellation where a dual-tone multi-frequency call is used to communicate the call cancellation after a failure of voice and Short Message Service (SMS) messages.

In accordance with yet a further feature of the invention, the change in the network resource allocation is a call cancellation where a dual-tone multi-frequency call is used to communicate the call cancellation after a failure of voice and Short Message Service (SMS) messages and prior to any data transfer.

In accordance with yet an added feature of the invention, the change in the network resource allocation is a call cancellation where all connections measures fail.

In accordance with yet an additional feature of the invention, the change in the network resource allocation is a call termination of a voice connection between the device and the service provider.

In accordance with again another feature of the invention, the change in the network resource allocation is a call cancellation before a voice connection is established between the device and the service provider.

In accordance with again a further feature of the invention, the change in the network resource allocation is a call cancellation before a voice connection is established between the device and the service provider and after a call action device is actuated.

In accordance with again an added feature of the invention, the change in the network resource allocation is a call redirection due to an upgrade.

In accordance with again an additional feature of the invention, the secondary communication channel supports out-of-band data.

In accordance with still another feature of the invention, the out-of-band data comprises short message service (SMS) data.

In accordance with a concomitant feature of the invention, the out-of-band data comprises dual channel packet data.

Although the invention is illustrated and described herein as embodied in a simplified manufacturer's install or retrofitting telematics system, methods for providing telematics to a vehicle, and systems and methods for controlling communications with a vehicle, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the systems and methods.

Additional advantages and other features characteristic of the systems and methods will be set forth in the detailed description that follows and may be apparent from the detailed description or may be learned by practice of exemplary embodiments. Still other advantages of the systems and methods may be realized by any of the instrumentalities, methods, or combinations particularly pointed out in the claims.

Other features that are considered as characteristic for the systems and methods are set forth in the appended claims. As required, detailed embodiments of the present systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one of ordinary skill in the art to variously employ the present systems and methods in virtually any appropriately detailed structure. Further, the terms and phrases used herein are not intended to be limiting; but rather, to provide an understandable description of the systems and methods. While the specification concludes with claims defining the features of the invention that are regarded as novel, it is believed that the systems and methods will be better understood from a consideration of the following description in conjunction with the drawing figures, in which like reference numerals are carried forward. The figures of the drawings are not drawn to scale.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present systems and methods will be apparent from the following detailed description of the exemplary embodiments thereof, which description should be considered in conjunction with the accompanying drawings in which.

DETAILED DESCRIPTION

Figure 1:
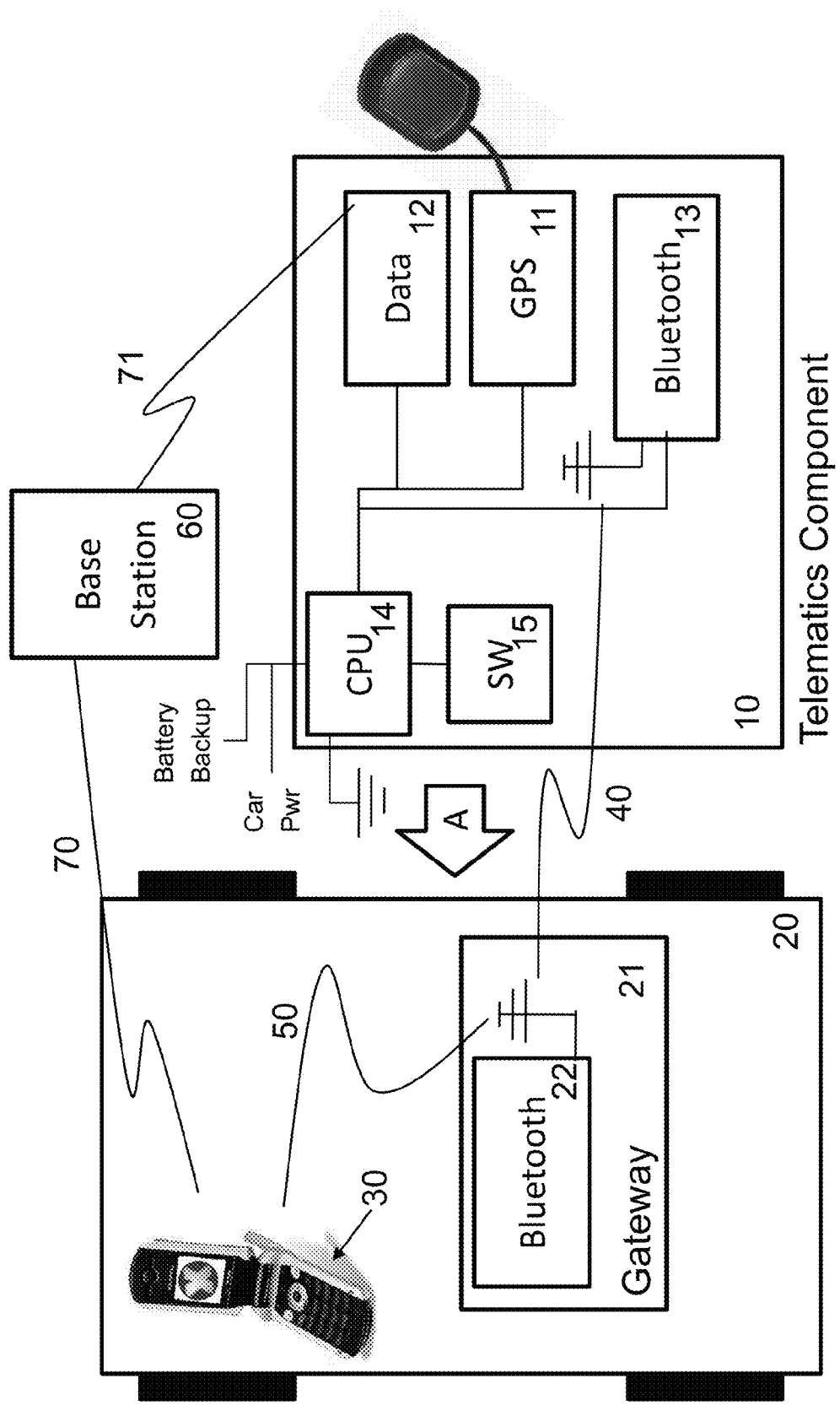
FIG. 1 is a diagrammatic illustration of a telematics component and base station according to an exemplary embodiment associated with a prior art vehicle and a cell phone in that vehicle.

As required, detailed embodiments of the present systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one skilled in the art to variously employ the present systems and methods in virtually any appropriately detailed structure. Further, the terms and phrases used herein are not intended to be limiting; but rather, to provide an understandable description of the systems and methods. While the specification concludes with claims defining the features of the systems and methods that are regarded as novel, it is believed that the systems and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems and methods will not be described in detail or will be omitted so as not to obscure the relevant details of the systems and methods.

Before the systems and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, and top/bottom. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

It will be appreciated that embodiments of the systems and methods described herein may be comprised of one or more conventional processors and unique stored program instructions that control the one or more processors to implement, in conjunction with certain non-processor circuits and other elements, some, most, or all of the functions of the powered injector devices described herein. The non-processor circuits may include, but are not limited to, signal drivers, clock circuits, power source circuits, and user input and output elements. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application," and the like as used herein, are defined as a sequence of instructions designed for execution on a computer system. A "program," "software," "application," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Herein various embodiments of the systems and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIG. 1, there is shown a diagrammatic illustration of a first exemplary embodiment of a telematics component 10. In this embodiment, the telematics component 10 includes a Global Positioning System (GPS) device 11, a data pump 12, and a Bluetooth transceiver 13. Each of these sub-systems is connected to a central controller 14, which can be a central processing unit (CPU), such as a microprocessor. Other telematics sub-systems can also be included in the telematics component 10 as desired. The telematics component 10 is installed (arrow A) in a vehicle 20 having a gateway 21 containing a Bluetooth transceiver 22. Power can be supplied to the component 10 either through a self-contained battery pack or a hardwired connection to a power supply of the vehicle (e.g., the battery).

The GPS device 11 is self-contained and, with the CPU 14 and appropriate internal software 15, is able to output any desired GPS data (e.g., time or position in various units or formats). The data pump 12 is configured to receive and supply data to the Bluetooth transceiver 13 for processing by the gateway 21 or CPU 14. Such data will be addressed in further detail below. The Bluetooth transceiver 13 is configured as a standard Bluetooth interface so that the telematics component 10 is recognized and paired just like any other device after the appropriate acknowledgement routine is carried out. Alternatively, the telematics component 10 can be hardwired into the vehicle.

It is noted that each vehicle 20 can have its own kind of gateway 21. Thus, display, control, and all other functions capable of being carried out by the gateway 21 will most likely be device-specific. Accordingly, the telematics component 10 is configured with appropriate software 15 for interfacing with each of the different gateways 21 presented for connection. In one embodiment, the telematics component 10 can be configured to operate with a single, specific gateway 21. Thus, a plurality of different telematics components 10 is created, e.g., one for each of the possible gateways 21. In such a case, the vehicle 20 in which the component 10 is to be installed is identified and the appropriate component 10 is used. Alternatively, the component 10 can be configured with all possible gateway interface operating configurations and, upon installation can be programmed to execute the appropriate configuration for that specific gateway 21. This execution can be manual (based upon user input of the corresponding vehicle identification) or can be automatic (through a sequence of question and answer transmissions to the gateway 21). Specifications of each gateway 21 may be provided by the vehicle manufacture so that the software 15 can be developed accordingly.

The customized software 15 enables a single GPS system 11, a single data system 12, and a single Bluetooth system 13 to be customized for interfacing with any functionality operable by or through the vehicle's gateway 21. Thus, even if the vehicle was not designed to provide GPS functionality, as long as the gateway 21 has a display (or is connected to a display) and as long as that display's specifications have been provided beforehand, the software 15 can format the call status/progress updates into a form suitable for projection by the existing display to the user.

As set forth above, standard gateways 21 have the ability to interface with cell phones 30 that are present in or near the vehicle 20. Communication can occur from the vehicle 20 through the cell phone 30 to a third party or from a third party to the cell phone 30 (e.g., SMS text) or through the cell phone 30 to the occupant in the vehicle 20 (e.g., voice call). The telematics component 10 is able to expand upon this ability to bi-directionally communicate outside the vehicle 20 by linking to the cell phone 30 through the gateway 21. Because the telematics component 10 has the ability to communicate any data it desires over the Bluetooth transmission channel 40 (i.e., the Bluetooth gateway), it can, for example, obtain the current paired client list of the Bluetooth 22 device in the gateway 21, and use one (or more) of the paired devices remotely through the secondary Bluetooth transmission channel 50. More specifically, if the telematics component 10 needed to send a message to a base station 60, then the data pump 12 would configure the appropriate data to be transmitted along with relevant control logic. Once the data pump 12 acknowledged that the communications channel 71 to the base station 60 was open (which state the telematics component 10 could detect), the control logic would then cause the appropriate data to be transmitted to the base station 60. The present invention, therefore, entirely eliminates the need for a bi-directional, voice-supporting cellular device to be included in the telematics component 10. The possible options for communication outside the vehicle 20 to a remote data center 60 lead to complexities associated with the proper first routing of such communications. As set forth in further detail below, the invention provides various methods and systems for routing such communications, whether the communication is associated with the retrofitting telematics component 10 described herein or the communication is associated with an integral, factory installed telematics system.

There are a number of exemplary uses for the inventive telematics component 10 so configured. One exemplary use is the most commonly found use of a telematics device—to summon roadside assistance. For the present example, the entity supplying the telematics component 10 has live operators at a remote facility, e.g., at the base station 60, for providing roadside assistance through a voice communication. Further, the telematics component 10 has a user interface control (which is not illustrated in FIG. 1 but could include software on gateway 21) that calls the operator center upon a single actuation. For example, the telematics component 10 can have a red "emergency" button that, when pressed, opens a communications channel to the operator. Accordingly, when the vehicle occupant presses the button, the appropriate software 15 is called up to enable a "live-operator-communication." The software 15 communicates via Bluetooth 13 to Bluetooth 22 to receive the active paired phones list. The active paired phones list is then passed to the data pump 12. Whatever additional data is needed for this operation (e.g., the destination address for the data center at the base station 60) is used by the data pump 12. The data pump 12 then triggers the gateway 21, which requires a first paired device (i.e., the cell phone 30) to receive a phone call from the base station 60, thus, carrying out the desired "live-operator-communication" function.

If, as shown in FIG. 1, the telematics component 10 has an embedded GPS system 11, the data sent to the base station 60 can include current GPS location coordinates of the vehicle 20. In this way, the operator could be provided with the information pinpointing the vehicle's location before voice communication occurs between the operator and the occupant.

Beneficial to the inventive system and process is the ability to utilize any Bluetooth communication device within range of the vehicle 20. Whether or not the device has already been recognized (i.e., coupled with the gateway 21 in the past) or is new to the system (in which case, a recognition protocol between the system and the device may need to be carried out), if the Bluetooth system 22 has the device's identification information in its client stack, then the telematics component 10 has the possibility of directing calls to and through each such device as desired. In normal use, however, the telematics component 10 merely retrieves the identity of all currently paired devices from Bluetooth 22. If desired, the component 10 can periodically communicate this information to the base station 60, which keeps a vehicle-specific paired-device list.

Alternatively, in a non-usual case, for example where a driver's cell phone 30 is unavailable but there are other cell phones in the vicinity of the vehicle 20, the telematics component 10 can inquire the gateway 21 to communicate with a person who has a communication device that is not associated with the vehicle. This communication may occur through a Bluetooth or other short range personal area network. In one embodiment where Bluetooth is the supported short-range personal area network, telematics component 10 inquires the gateway 21 to obtain all possible pairings of the Bluetooth system 22 and, thereby, possibly start communication with another person who is close to the vehicle 20 but not associated with the vehicle 20. To illustrate this point further, if the driver cannot answer the cell phone 30 but there are bystanders near the vehicle 20 who have cell phones, the telematics component 10 can obtain the phone number(s) from the bystanders and have emergency personnel call that phone for information about the emergency.

Roadside assistance is only one of the possible telematics functions that could be provided with the inventive telematics component 10 of the present invention. Another function that could be provided with the component 10 is a door-unlock command. If the gateway 21 is communicatively coupled with the device that unlocks a locked door of the vehicle, then the telematics component 10 can interface with that door-unlocking device. As set forth above, the manufacturer provides the specifications for causing the gateway 21 to actuate the door-unlocking device. The telematics controller 10 stores this specification data internally. After appropriate authentication, the operator can transmit the pre-programmed authorization command to the telematics controller 10 via the data pump 12. When the telematics controller 10 receives the authorization command, the appropriate control logic is sent to the gateway 21 to activate the door-opening device. If the gateway 21 is similarly connected to the vehicle starting assembly, then the telematics controller 10 can effect a remote engine start with little added difficulty. Likewise, if the gateway 21 has access to the vehicle's diagnostics bus, then any available diagnostic status can be made accessible not only to the driver, but also to an operator at the base station 60. In an emergency, where the driver/passenger(s) is not available, the telematics controller 10 can be programmed to automatically send a diagnostics state(s) to the base station 60.

Figure 2:
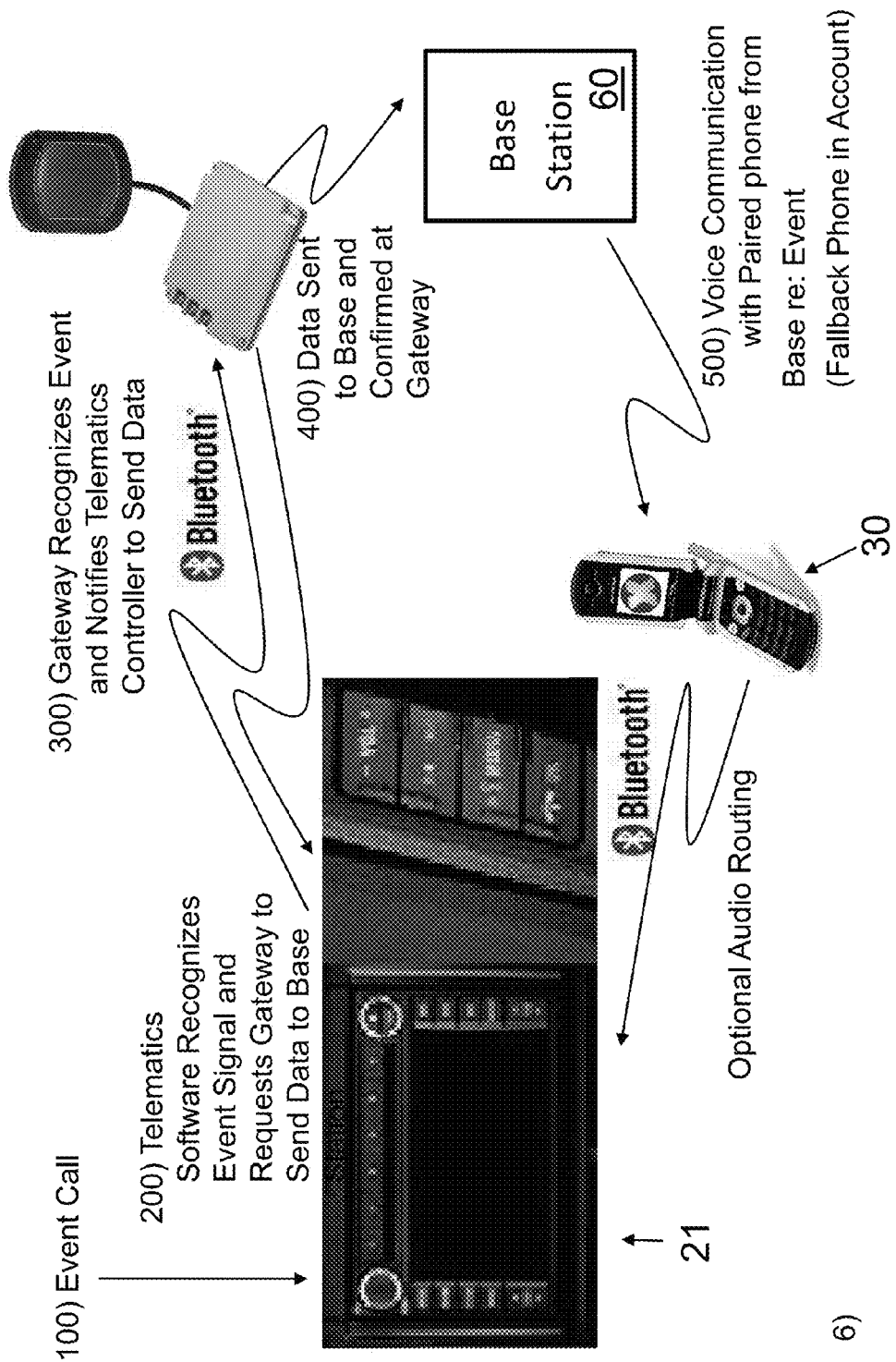
FIG. 2 is a diagrammatic illustration of a process for utilizing the telematics component according to an exemplary embodiment.

For example and with reference to FIG. 2, after an event occurs that requires the telematics software 15 to take an action, referred to herein as an event call, the base station 60 can be provided automatically with both diagnostics data and GPS position data. Also sent to the base station 60 is the cell phone number for one or more currently paired cell phones 30 within the Bluetooth PAN of the vehicle 20. Upon receiving the event call, an operator can be directed to call any or all of the currently paired cell phones 30 associated with that vehicle 20.

Figure 3:
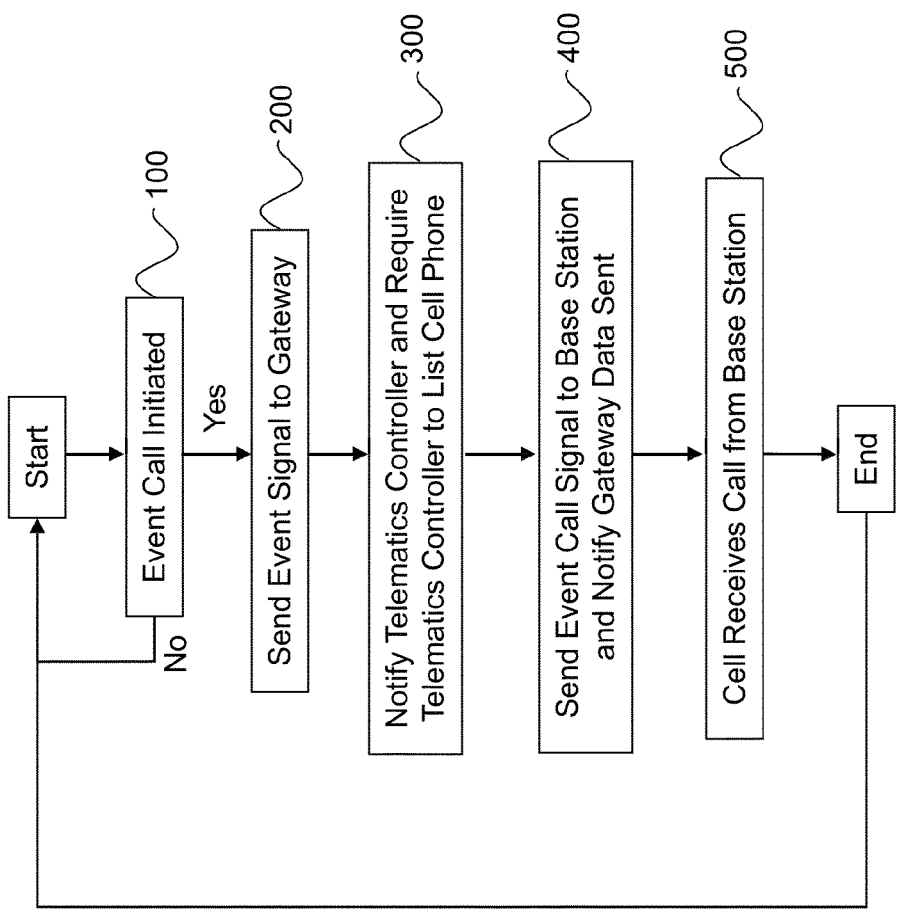
FIG. 3 is a flow chart of the process for utilizing the telematics component of FIG. 2.

More specifically, reference is made to the flow chart of FIG. 3 to describe this process. Beginning in Step 100, the system waits for an event call. When an event call occurs, an event signal is sent to the gateway 21 in Step 200. The telematics software 15 on the gateway 21 recognizes receipt of the event call. In Step 300, the telematics software 15 notifies the telematics controller 10 and sends the appropriate data to the telematics controller 10 to list at least one cell phone 30 in the Bluetooth stack of the gateway 21. In Step 400, the telematics controller 10 sends an event call signal to the base station 60 and notifies the gateway 21 that the data was sent. The cell phone 30 receives a call from the base station 60 connecting the cell phone audio to the base station 60 in Step 500. If desired, audio from the cell phone 30 can be routed to the vehicle's speakers to the occupant via Bluetooth 22. In this way, by having the base station 60 call the vehicle directly, the inventive system avoids an issue that has plagued the telematics industry since its early days—bad Caller-ID. Additionally, or alternatively, the base station 60 can have a fallback phone number for such an emergency and, simultaneously or thereafter, can require an operator to call that phone number.

Figure 4:
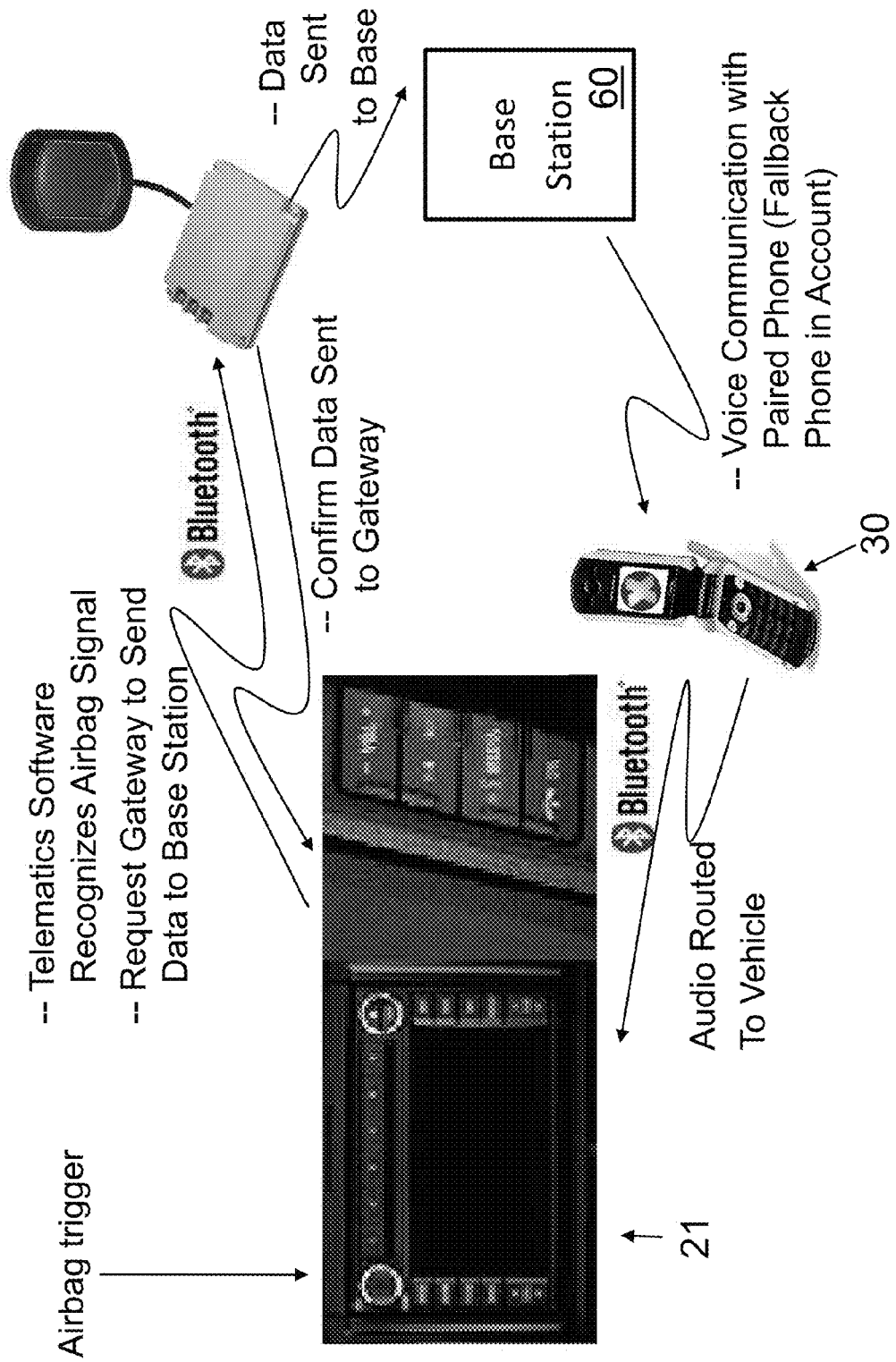
FIG. 4 is a diagrammatic illustration of a process for utilizing the telematics component according to an exemplary embodiment.

Deployment of an airbag and the resulting communication with the invention is described with reference to FIG. 4. After an air bag is deployed, the base station 60 needs to be provided with both diagnostics data and GPS position data. More specifically, an airbag trigger signal is sent to the gateway 21. The telematics software 15 on the gateway 21 is configured to recognize receipt by the gateway 21 of the airbag trigger. The telematics software 15 is programmed to have the telematics controller 10 gather appropriate data for the base station along with a list of at least one cell phone 30 in the Bluetooth stack of the gateway 21. The telematics controller 10 sends an airbag deployment signal to the base station 60 and notifies the gateway 21 that the signal was sent. Also sent to the base station 60 is the cell phone number for one or more currently paired cell phones 30 within the Bluetooth PAN of the vehicle 20. Upon receiving an accident indication, an operator at the base station 60 can be directed to call any or all of the currently paired cell phones 30 associated with that vehicle 20. The cell phone 30 receives a call from the base station 60 informing the user of the cell phone of the airbag deployment. If desired, audio from the cell phone 30 can be routed to the vehicle's speakers to the occupant via Bluetooth 22.

There are instances where the driver/owner of the vehicle 20 should be notified about current conditions of the vehicle 20. For example, if the vehicle's alarm system activates and the driver is not within range of the vehicle 20, then the operator at the base station 60 can be silently informed of the alarm's activation and call a pre-programmed cell phone, such as the owner's phone, or can be asked to call the police with GPS position information of the vehicle 20.

Other telematics functions require information from the GPS module 11. If position, direction, and speed are made available to the software 15 and base station 60 from the telematics controller 10, then it is possible to carry out, for example, speed alerts, real-time remote vehicle location requests, geo-fencing, stolen vehicle recovery procedures, and updates for traffic, weather and/or parking. If the in-vehicle display controlled by the gateway 21 is sufficiently robust, then navigation, point-of-interest, and trip-planning features can be made available to the driver without installing a costly navigation system in the vehicle.

A device and method for simplifying manufacturer-fitted telematics systems and retrofitting a telematics communication and control unit in a vehicle configured with a Bluetooth transceiver has been disclosed that overcomes the disadvantages of the prior art.

Communications

As can be envisioned, as the vehicle is enabled with communications suites that have different ways to communicate with a service provider's remote data center or just with the outside world, and due to the fact that the service provider's remote data center likewise has different ways to communicate with a vehicle and with the world outside the vehicle, there arises a need to handle, control, manage, and prioritize each of the possible ways through which such communication can occur. The invention provides, in the following sections, a number of ways to handle and control communications. The manner in which communications are handled will determine how various services interact, how quickly they respond, how customers are provided with correct information and how fast that occurs, and how correctly a request is handled.

Telematics Voice and Data Dynamic Routing

One of the first ways to manage communications in a connected vehicle is to pre-configure routes of communications and their end points. A significant benefit provided by the invention is that it allows a system administrator to configure end points without impacting the availability of the system. The invention enables the system to automatically re-route both voice and data to any different configurable end point based on actions taken by the driver, the remote agent, or the system components. Simply put, the invention lies in the system administration of the communication resources.

Based on the type of call made, the invention determines what will be the initial landing point for that call. From a technology standpoint, the routing is non-static and resources are allocated as each request comes in. An example of the process for dynamically routing telematics communications is illustrated with use of Table 1 below.

detail to illustrate how the systems and methods of the invention dynamically routes these various telematics calls.

Assuming, for example, a manual emergency call is received by the invention (first three rows). Each manufacturer (OEM) will most likely have a different communications system (the flexible telematics system describe above being one of the many different "manufacturers" referenced here). As such, each OEM will have a respective and corresponding device type. Therefore, for each different OEM, the routing table will have a different entry. Here, OEM1 is shown and OEM1 has the three different possible states of the device when a manual emergency call occurs. First, if the vehicle has not subscribed to the manual emergency call service provided by the telematics service provider, then the system dynamically routes this manual emergency call to an interactive voice recognition (IVR) system. This call is not routed to a live operator because the vehicle has not purchased this service. When so routed, the IVR system begins a set of automatic prompts that inform the user that the vehicle has not subscribed to the requested service and, possibly, markets the sale of such service to the vehicle, so-called "up-selling." A second alternative can be that the vehicle has subscribed to this service. In such a case, the call would be immediately routed to a call center associated with that OEM. A third alternative exists when a vehicle has not yet been sold, a so-called "initial" state. In this situation, the OEM could desire to test the manual

TABLE 1

| Call Type | Device Type | Device Status | System | Endpoint |
|---|---|---|---|---|
| Manual Emergency Call | BASE-OEM1 | Inactive | IVR | http://OEM1host/telematics/IVR |
| Manual Emergency Call | BASE-OEM1 | Active | CallCenter | http://OEM1host/CallCenterSvc |
| Manual Emergency Call | BASE-OEM1 | Initial(Shell/Shell2) | IVR | http://OEM1host/telematics/IVR |
| Automatic Emergency Call | BASE-OEM1 | Inactive | CallCenter | http://OEM1host/CallCenterSvc |
| Automatic Emergency Call | BASE-OEM1 | Active | CallCenter | http://OEM1host/CallCenterSvc |
| Automatic Emergency Call | BASE-OEM1 | Initial(Shell/Shell2) | CallCenter | http://OEM1host/CallCenterSvc |
| Information Call | BASE-OEM1 | Inactive | IVR | http://OEM1host/telematics/IVR |
| Information Call | BASE-OEM1 | Active | IVR | http://OEM1host/telematics/IVR |
| Information Call | BASE-OEM1 | Initial(Shell/Shell2) | IVR | http://OEM1host/telematics/IVR |
| Panic Alarm Service | BASE-OEM2 | Active | TS | http://OEM-independent/PanicAlarmSvc |
| Panic Alarm Service | BASE-OEM3 | Active | TS | http://OEM-independent/PanicAlarmSvc |
| Remote Data Service | BASE-OEM2 | Active | DS | http://OEM-independent/RemoteDataSvc |
| Service Data Service | BASE-OEM3 | Active | DS | http://OEM-independent/RemoteServiceMgmtSvc |
| Stolen Vehicle Locator Service | BASE-OEM1 | Active | TS | http://OEM-independent/StolenVehicleSvc |
| Stolen Vehicle Locator Service | BASE-OEM3 | Active | TS | http://OEM-independent/StolenVehicleSvc |

This table diagrammatically illustrates a look-up process for dynamically routing various types of telematics calls. Only a few kinds of telematics communication types are illustrated here, including a manual emergency call, an automatic emergency call, a call for information, a panic alarm call, a call for remote vehicle service, a call to set up a service appointment, and a call to request stolen vehicle location information. Each one need not be described in emergency call communications system and, by activating that call in the vehicle, the OEM would hear the automated response of the IVR to confirm that the system is working. Also available in this situation is the desire for a dealer to demonstrate the manual emergency call feature of the vehicle. When in the "initial" state, the telematics provider would route the call to a marketing IVR in and attempt to sell or just demonstrate the capability.

One kind of automatic emergency call is made when an airbag deploys in the vehicle. In such a case, regardless of the status of the telematics system in the vehicle, an immediate call to the OEM's call center is desired. This call is, therefore, placed through to the call center when made.

In most instances where a vehicle is requesting information from the telematics provider, the first routing will be to an IVR because a live operator is not needed. As such, the communication will be routed to the IVR for that OEM and the automated process will guide the vehicle dependent upon that OEM's particular configuration The illustration of the panic alarm service from two different OEMs in Table 1 is meant to show that a specialized type of telematics service (TS) occurs that can be the same regardless of the vehicle's OEM. Here, it is envisioned that a panic service call needs to be handled in a special way, but in a way that is independent of the particular OEM. As such, the system can give a short IVR query or can direct the vehicle to a live operator. This service is dependent upon various algorithms, logic, and business rules that indirectly access data. The next two entries, in contrast, directly access data services (DS) and, therefore, are handled differently and in any way that the OEM desires. For example, to request a service call, the entire process can be routed to an automated IVR exchange that takes in all necessary data sufficient to set up a service appointment for the vehicle.

A stolen vehicle locator communication is similar to the panic alarm communication and can be routed similarly, but with different queries, for example.

The communications routing of the invention allows the telematics service provider (i.e., the administrator) to predefine routing based on the particular OEM, the particular, device and/or the particular call type. The specific ways of routing these communications is done without making code changes to the particular end points, for example, with a relational database. The single call is able to be rerouted based on status information and/or data and the telematics system makes the decision to reroute the particular call to an operator or a IVR, or any other endpoint. The path chosen is based on user inputs, vehicle inputs, and/or data that the call takes within the system.

Telematics Profiles Affect Call Flow

Once such calls are made from a particular vehicle, they are not simply discarded. The systems and methods of the invention leverage each call to compile a particular profile for each vehicle to anticipate future behavior and better route communications from that particular vehicle. Based on the different interactions that occur over time, the system updates the vehicle's profile to adapt future behavior based on what was done today. The inventive systems and methods support altering the call flow based on user action. In other words, the execution path may be altered dynamically in real-time based upon the occurrence of certain events. Specific examples of this functionality are provided in the following paragraphs.

One simplified example occurs when a new customer uses the service for the first time. In such a situation, the user is forwarded to a "first marketing campaign" that can be performed through an IVR process. Then, after review and acceptance, the user is routed to a live agent for obtaining the subscription from the vehicle. Once this call occurs, the profile of the vehicle can be updated to show that the "first marketing campaign" was already provided to that vehicle that that this campaign should not, again, be supplied to the vehicle. As the profile is updated, the system can know how to treat all future calls and to not treat them the same.

Likewise, if a user makes a call after an initial vehicle purchase, a so-called "Drive-Off Event", or a customer who cancelled service, when that call is received at the service provider's call center, the receiving agent has the ability to either enroll the account of the user or to mark it as an inactive account. Depending on which actions are chosen, the execution path for all subsequent calls from the vehicle associated with this account will be different.

The system stores information about prior user actions and reacts accordingly when the user makes a call to the system. For example, when the user triggers an information call to the system, marketing messages, recall messages, and/or high priority alerts are played to the user by the IVR system. If the user hears these messages and acknowledges the messages as heard, the system stores this fact. The next time the user triggers an information call, therefore, the messages that were acknowledged will not be presented again.

The system provides the user with an ability to alter the execution path dynamically. When the IVR system receives a call, the IVR system retains the ability to route the call to an agent or another service provider based on the user input to the menu presented. The same functionality is available to the call center agent (at the service provider), wherein, based on what the user requests, the agent can route to the call to another provider or decide to service the call directly. Both the user and the call center agent are also able to send requests to the vehicle to resend the signal/call with updated data (e.g., location, speed) or to terminate the call.

Call Cancel/Termination

One of the issues relating to telematics calls is call cancellation or termination. After a user completes a call with a live operator, the operator knows that the call is ending or has ended by hearing the user's salutation of goodbye. However, there are many instances when a telematics call is initiated and is cancelled for a number of possible reasons, such as intentionally by the user, accidently by the user, or trouble with the communications link, to name a few. In such instances, the operator is left, typically, with silence and no way to know that the user is no longer part of the communication. The operator does not know if the unit in the vehicle will automatically be connecting back or if the user prefers no further contact and has ended the call. This leads to waste of service provider time and, in some instances, is detrimental to user's safety when emergencies occur.

The invention addresses the problems associated with call cancellation by providing a notification to the service provider of a change in intent of the user through a "secondary channel," thus saving the service provider resource time. The invention supports out-of-band data, such as SMS or dual channel packet data, and, thereby, allows the service provider to be notified that the service request is cancelled or the request type has been changed without delaying service delivery and without having a service provider resource assigned to a request that will not arrive. Communication of data via a data network can be accomplished using link 71 or link 70, e.g., using Bluetooth transmission channels 40, 50. However, voice and data traffic does not occur over the same link. This approach allows the service provider to not assign or to release an assigned resource much quicker after the change in request or cancellation of the request.

Broadly put, the originating device (e.g., the user interface in a vehicle connected to the telematics communication device), upon registering the user's change of intent, automatically transmits the changed information (cancel, upgrade, alteration of request) to the service provider. The transmission occurs in a way that is different from that which is already in progress so that the ongoing request is not interrupted without cause. In one exemplary embodiment of the invention, the system cleanly ends the call by having the vehicle send an SMS message from the telematics unit in the vehicle to the operator. Another exemplary embodiment utilizes a data channel (e.g., packet data) telling the operator/agent that the call has ended. Use of these secondary communication channels is not limited to merely call cancellation, as will be discussed in further detail in the sections below.

The service provider, upon receiving the change of request, is able to deconstruct or change the request in an organized predictable fashion. It is known that, nationally and internationally, that some call centers handling telematics calls, such as roadside assistance, vehicle service appointments, marketing, renewals, and concierge services (e.g., towing, movie times, dinner reservations, flower delivery), are contracted out to third party operators and that these third parties are paid on a per call per minute basis. Therefore, high efficiency and rapid cancellation of calls that prevent unwanted use of call center operator time is highly desirable.

FIGS. 5 to 12 are communication transfer timeline diagrams illustrating how the invention handles call termination in various scenarios. The methods of FIGS. 5 to 12 can be applied generally to Mobile Terminated (MT) calls. Temporary Location Directory Number (TLDN) calls are a type of MT call. Communication points are present across the top of the figures. These communication points include: (1) the driver or user; (2) the action device that initiates the call (which can be a user headset, a button on the phone or the gateway, a voice command, or any other compatible user input device); (3) the telematics unit of the vehicle (TMU); (4) a telecommunications network (which can be any provider of voice and/or data communications from the telematics unit to the service provider); (5) the remote center of the service provider; and (6) the IVR, information retrieval system (e.g., computer(s) than can fulfill a request without needing voice input), or the live operator at the service provider. The timeline for making the various calls traverses from the top of each figure and progresses towards the bottom in each case. These timelines clearly illustrate the use of the secondary channel of communication in the process of call cancellation which, in some of these cases, is through SMS data. In one embodiment, data transmission via link 71 can be bi-directional.

Figure 5:
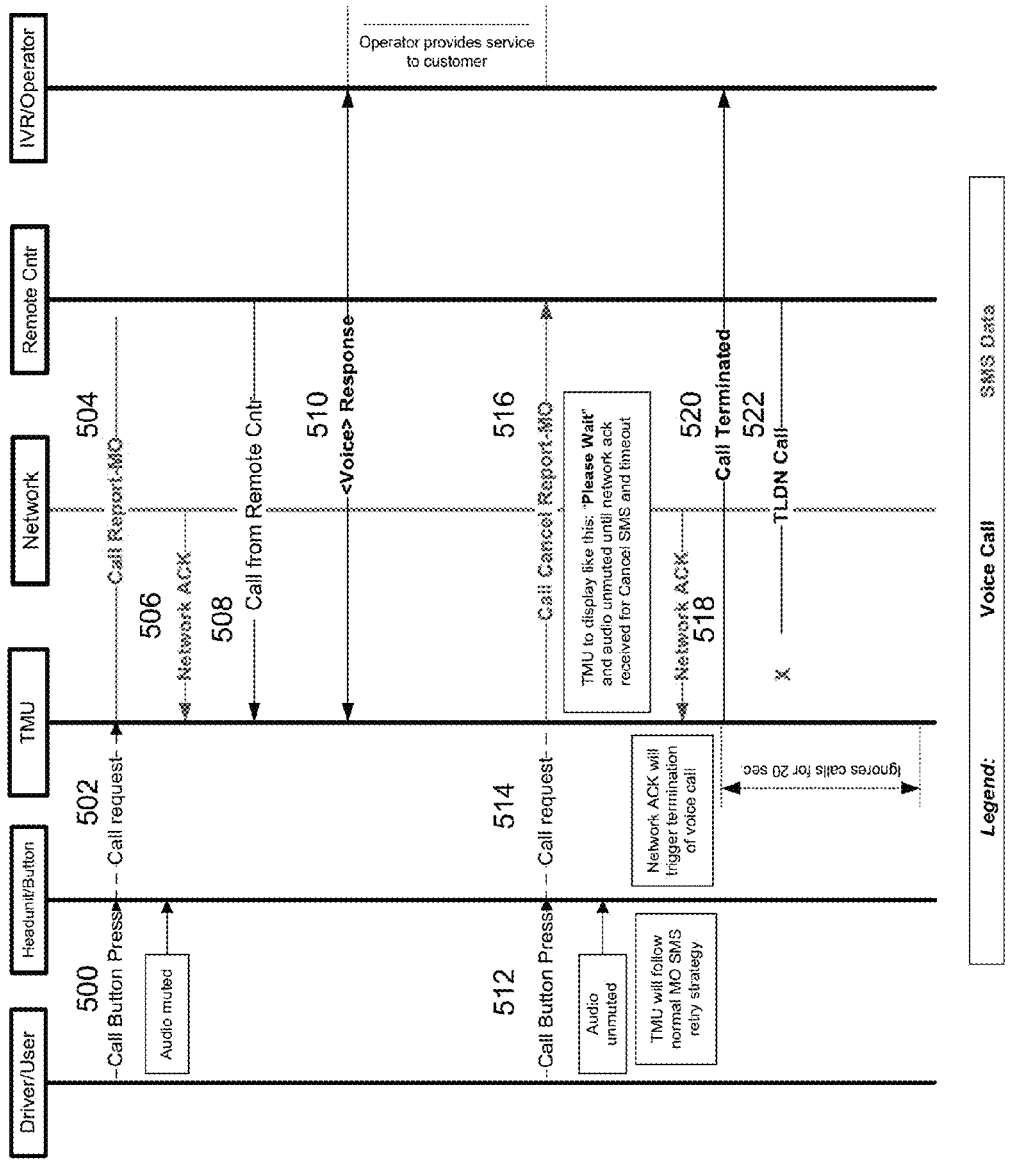
FIG. 5 is a communication transfer timeline diagram illustrating an exemplary embodiment of how one type of call cancellation is handled.

The exemplary process of the invention shown in FIG. 5 illustrates the sequence flow of a call termination when there is a voice connection between the driver/user and the operator at the remote center. In step 500, the user actuates the call indicator (i.e., presses the call button) to begin a call request. The indicator actuates the appropriate hardware and software in the TMU to commence a call request in step 502. The TMU communicates through the network to the remote center of the service provider that a call from the vehicle is incoming in step 504 and the network acknowledges the call request back to the TMU in step 506. The remote center, in step 508, makes the call to the TMU and, in step 510, voice communication occurs to allow the operator to provide service to the customer.

To have the call end, the user actuates the call indicator (i.e., presses the call button) for the second time in step 512. The indicator actuates the appropriate hardware and software in the TMU to commence a call cancel in step 514. The TMU communicates through the network to the remote center of the service provider that a call from the vehicle is ending in step 516 and the network acknowledges the call termination request back to the TMU in step 518. The TMU, in step 520, terminates the call to the remote center and, in step 522, voice communication terminates to allow the operator to provide service to another customer. At the end of the call, indicated by the "X" in the last line of FIG. 5, will cause the operator to receive a message (e.g., visually on an operator terminal screen and/or aurally through a speaker) indicating that the call was ended by the user.

Figure 6:
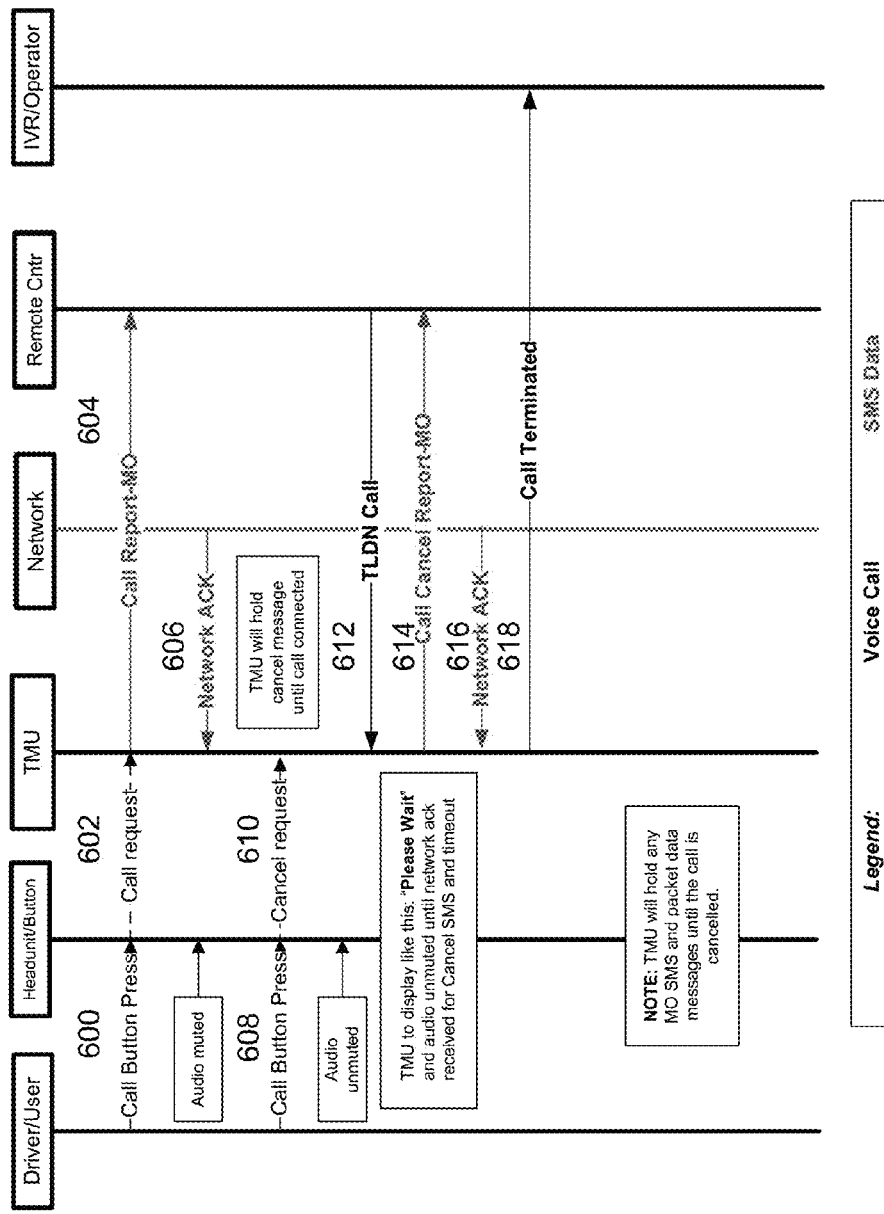
FIG. 6 is a communication transfer timeline diagram illustrating an exemplary embodiment of how another type of call cancellation is handled.

The exemplary process of the invention shown in FIG. 6 illustrates the sequence flow of a call cancel when the call is cancelled before there is a voice connection between the driver/user and the operator at the remote center. In step 600, the user actuates the call indicator (i.e., presses the call button) to begin a call request. The indicator actuates the appropriate hardware and software in the TMU to commence a call request in step 602. The TMU communicates through the network to the remote center of the service provider that a MT call request from the vehicle is incoming in step 604 and the network acknowledges the call request and initiates the call to the TMU in step 606. In one embodiment, the MT call may be a TLDN call.

Before the remote center makes the call to the TMU, however, here in this example, in step 608, the user presses the call indicator again to indicate that the call should be terminated. The indicator actuates the appropriate hardware and software in the TMU to commence a call cancel in step 610. In step 610, the TMU recognizes the cancel request, however, the TMU knows it is expecting the MT call. Knowing that cellular radio can be overloaded with too much traffic in a short time, the TMU holds the message for call cancel until the MT call is established or a timeout has occurred. Once the MT call is established, in step 612, the TMU knows that the call cancel request has a higher likelihood of reaching the remote center. The call cancel is sent in step 614, which triggers the network acknowledgement in step 616 and a notification to the agent that the call will be ending. The operator is notified by a message on the screen. The message indicates a call drop or a call cancel.

Figure 7:
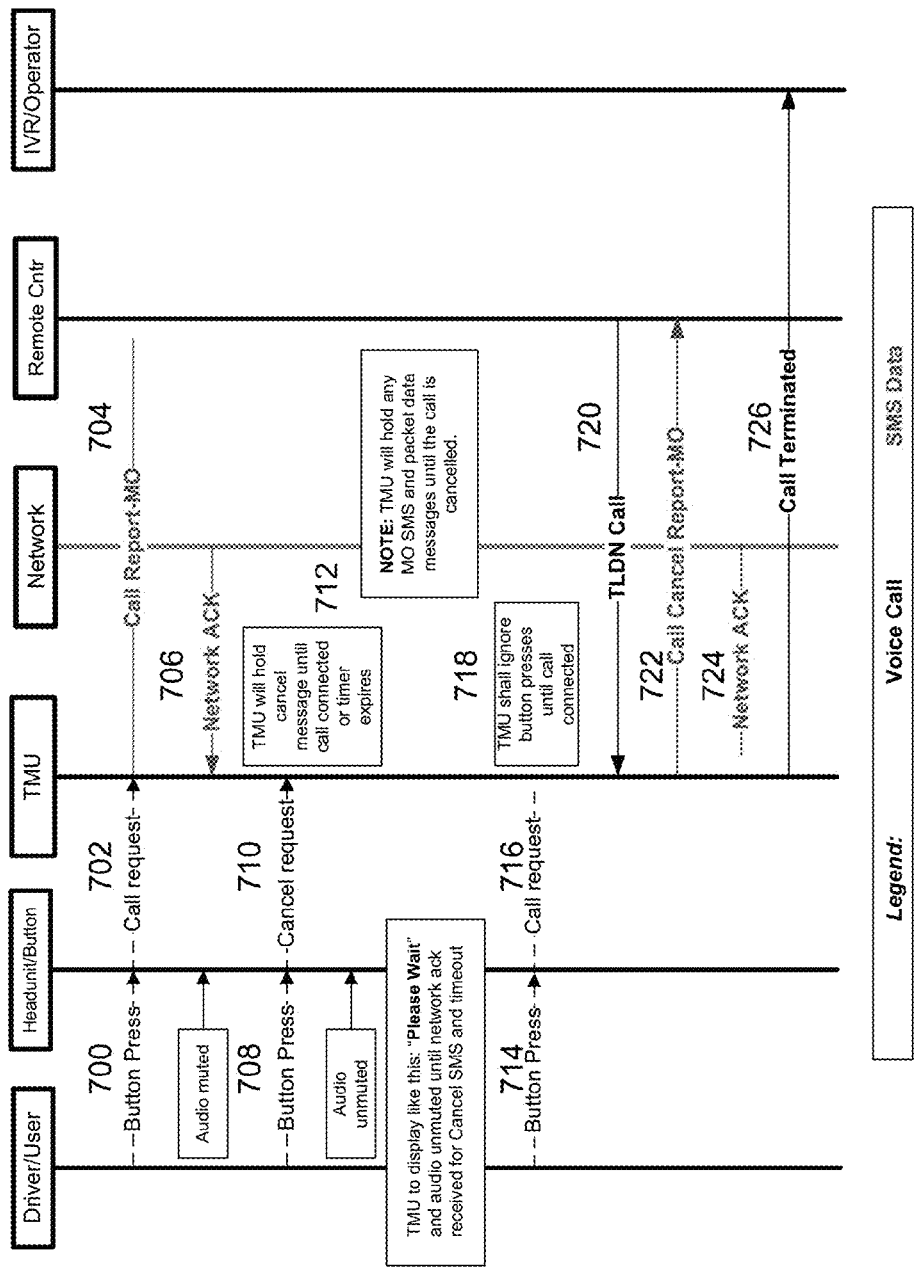
FIG. 7 is a communication transfer timeline diagram illustrating an exemplary embodiment of how a further type of call cancellation is handled.

The exemplary process of the invention shown in FIG. 7 illustrates the sequence flow of a call cancel when the call is cancelled before there is a voice connection between the driver/user and the operator at the remote center but after the call action device (e.g., the button) is actuated/pressed three times. In step 700, the user actuates the call indicator (i.e., presses the call button) to begin a call request. The indicator actuates the appropriate hardware and software in the TMU to commence a call request in step 702. The TMU communicates through the network to the remote center of the service provider that a call from the vehicle is requested in step 704 and the network acknowledges the call request back to the TMU in step 706.

Before the remote center makes the call to the TMU, however, here in this example, in step 708, the user presses the call indicator again to indicate that the call should be terminated. The indicator actuates the appropriate hardware and software in the TMU to commence a call cancel in step 710. However, the cancel request has not yet reached the remote center and, therefore, in step 712, the TMU will hold the cancel message until the call is connected or until a pre-defined timer for receiving the call expires. It is noted that the TMU will hold any MO SMS and packet data messages until the call is cancelled.

Then, unlike in the above examples, the user activates the call action device for the third time in step 714. The indicator actuates the appropriate hardware and software in the TMU to commence a call request in step 716. The TMU, in step 718, ignores the third press of the call button until the call is connected. In step 720, the remote center places the call to the TMU. Now the TMU takes action on the cancel request sent in step 708 by communicating through the network to the remote center that the call from the vehicle is ending in step 722. The network acknowledges the call termination request back to the TMU in step 724 and the TMU, in step 726, terminates the call to the remote center without voice communication occurring with the operator, thereby allowing the operator to provide service to another customer. The agent can be notified, upon receipt of the call cancel report from the TMU to the remote center, that the customer has requested an end of call. This gives the agent the notification slightly before the call will actually end, resulting in a lower risk of operator confusion.

In the above example, the third action of the call action device is ignored. This, however, might not be the desired outcome if the first, second, or third actions are not merely a low-priority, user-initiated call for information that would require use if an IVR exchange, for example, shown in line 1 of Table 2 below. Where the actions are different, other possible outcomes could be desired with regard to the second and third actuations. Table 2 below illustrates such possible examples and this list is in no way considered to be complete; it is merely exemplary.

TABLE 2

| Action 1 | Action 2 | Action 3 | Operation |
| --- | --- | --- | --- |
| IVR | IVR | IVR | Ignore action 3 |
| IVR | IVR | SOS | Ignore action 3 |
| IVR | SOS | IVR | Ignore action 3 Treat action 2 as upgrade |
| IVR | IVR | ACN | Ignore action 2 Treat action 3 as upgrade |
| SOS | IVR | SOS | Ignore action 2 Send Cancel SMS |
| SOS | SOS | IVR | Ignore action 3 |
| SOS | SOS | ACN | Ignore action 2 Treat as upgrade |

Figure 8:
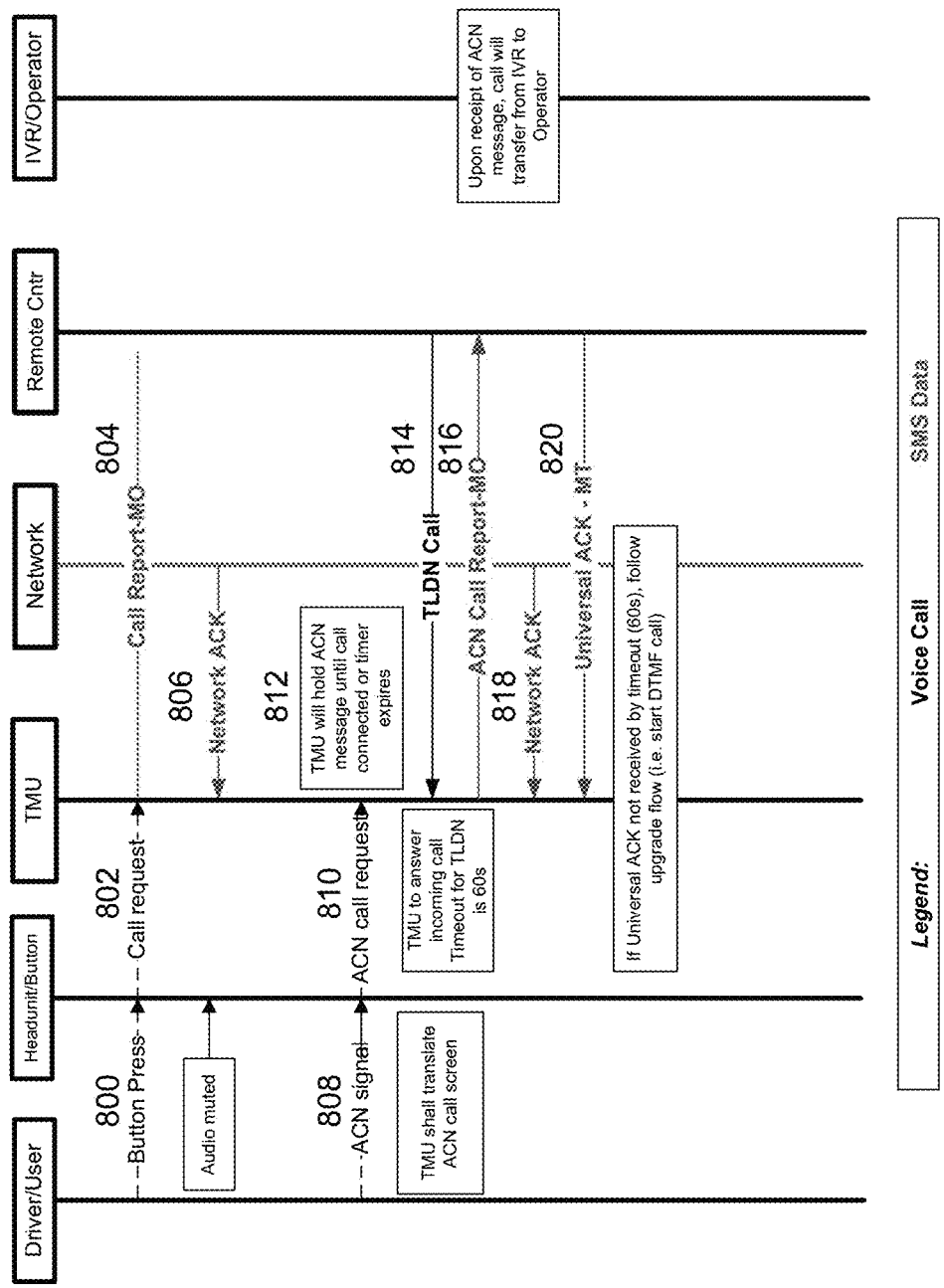
FIG. 8 is a communication transfer timeline diagram illustrating an exemplary embodiment of a call type upgrade.

The exemplary process of the invention shown in FIG. 8 illustrates a timeline of a call type upgrade. More specifically, FIG. 8 illustrates the sequence flow of a call that is redirected from the IVR to a live agent because of an intervening call upgrade indication; here, the call upgrade is an automatic collision notification (ACN). In step 800, the user actuates the call indicator (i.e., presses the call button) to begin a call request. The indicator actuates the appropriate hardware and software in the TMU to commence a call request in step 802. The TMU communicates through the network to the remote center of the service provider that a call from the vehicle is incoming in step 804 and the network acknowledges the call request back to the TMU in step 806.

Before the remote center makes the call to the TMU, however, here in this example, in step 808, the ACN signal activates, causing the appropriate hardware and software in the TMU to commence an ACN call request in step 810. As a call has already been requested, there is no logical need to place a second, identical call request to the remote center. Therefore, in step 812, the TMU holds the ACN message until the call is connected (or until after a pre-defined timer expires). In step 814, the remote center places the call to the TMU. The TMU now communicates through the network to the remote center of the service provider that an ACN call from the vehicle is incoming in step 816 and the network acknowledges the call request back to the TMU in step 818. The remote center performs acknowledgement of the ACN in step 820. The call continues with the call having been routed to an operator. The operator handles the call as an ACN.

In this example, the original call is assumed to be a low-priority, user-initiated call for information that would require use if an IVR exchange, for example, shown in line 2 of Table 3 below. Where the actions are different, other possible outcomes could be desired with regard to the first actuation and the kind of upgrade. Table 3 below illustrates such possible examples and this list is in no way considered to be complete; it is merely exemplary.

TABLE 3

| Original Call | Upgraded Call |
| --- | --- |
| IVR/iCall | SOS |
| IVR/iCall | ACN |
| SOS | ACN |

Figure 9:
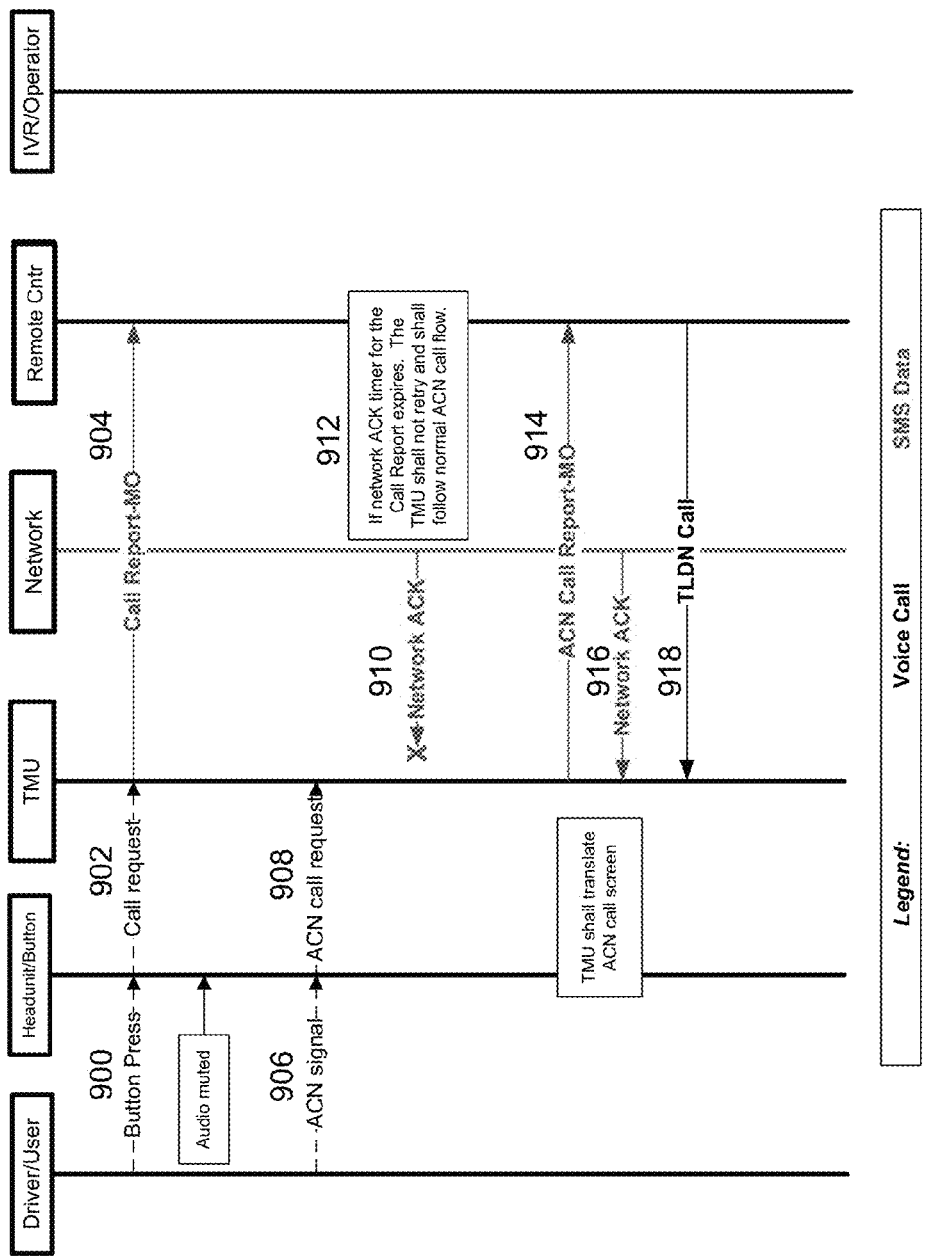
FIG. 9 is a communication transfer timeline diagram illustrating an exemplary embodiment of a call type upgrade with handling of cellular error conditions.

The exemplary process of the invention shown in FIG. 9 illustrates a timeline of a call type upgrade with handling of cellular error conditions. More specifically, FIG. 9 illustrates the sequence flow of a call that is redirected from the IVR to a live agent because of an intervening call upgrade indication but where there is no network acknowledgement. In step 900, the user actuates the call indicator (i.e., presses the call button) to begin a call request. The indicator actuates the appropriate hardware and software in the TMU to commence a call request in step 902. The TMU communicates through the network to the remote center of the service provider that a call from the vehicle is incoming in step 904. In contrast to the preceding example, the network does not acknowledge the call request back to the TMU. Here in this example, the ACN signal activates in step 906, causing the appropriate hardware and software in the TMU to commence an ACN call request in step 908. As a call has already been requested in step 900, there is no logical need to place a second, identical call request to the remote center. Therefore, in step 910, the TMU waits until the network acknowledges the first call. Here, it is assumed that no such acknowledgement occurs and, therefore, the pre-defined timer expires in step 912. The TMU does not retry the first call but, instead, follows the typical ACN call flow by communicating, in step 914, through the network to the remote center of the service provider that an ACN call from the vehicle is incoming. The network acknowledges the call request back to the TMU in step 916. The remote center performs the ACN response with a call in step 918. Once an agent or customer decides that all needed services have been rendered, the call is ended.

In this example, the original call is assumed to be a low-priority, user-initiated call for information that would require use if an IVR exchange, for example. Where the actions are different, other possible outcomes could be desired with regard to the first actuation and the kind of upgrade. Table 4 below illustrates such possible examples and this list is in no way considered to be complete; it is merely exemplary.

TABLE 4

| Original Call | Upgraded Call |
| --- | --- |
| IVR | SOS |
| IVR | ACN |
| SOS | ACN |

Figure 10:
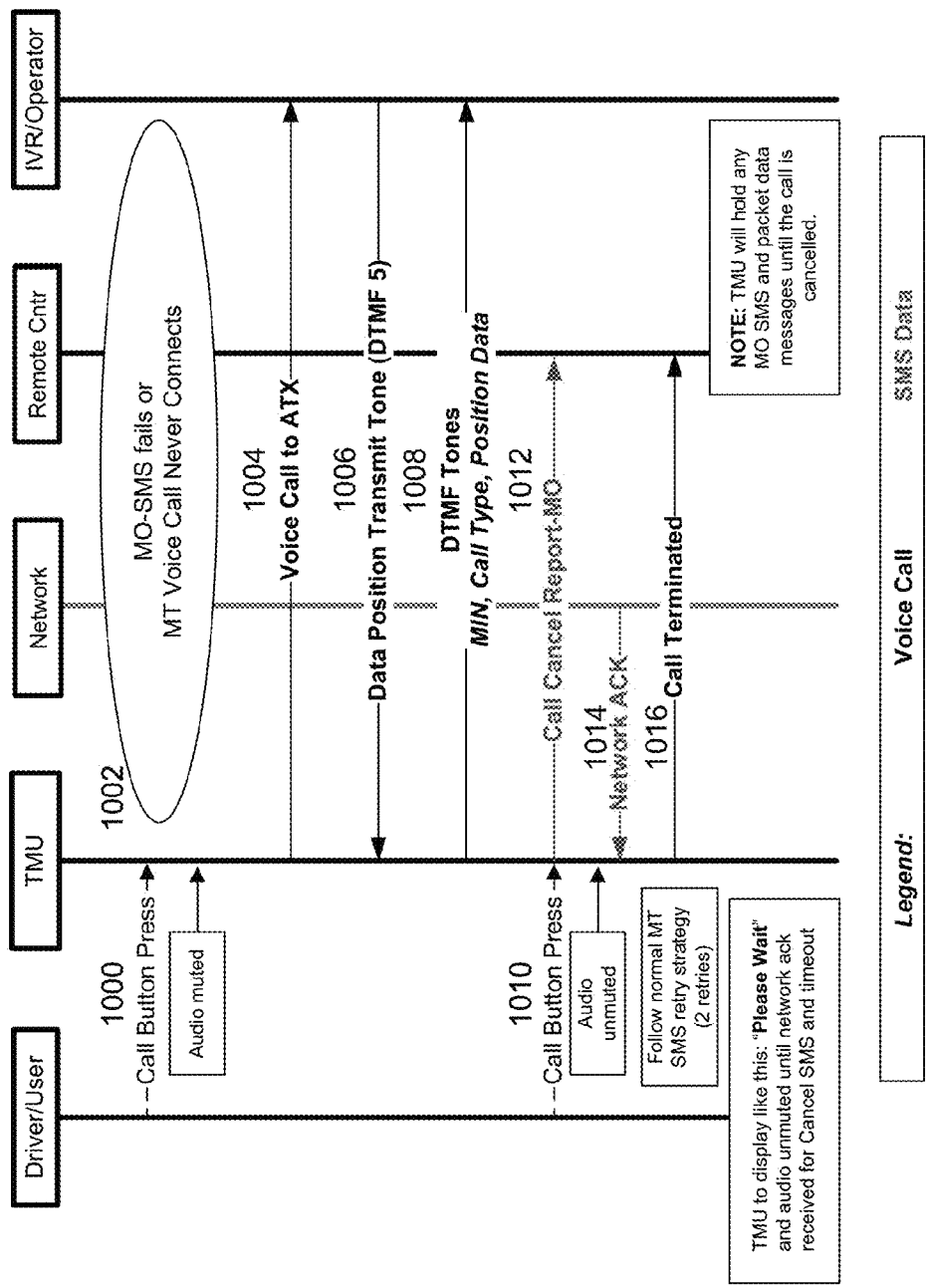
FIG. 10 is a communication transfer timeline diagram illustrating an exemplary embodiment of how yet another type of call cancellation is handled.

The exemplary process of the invention shown in FIG. 10 illustrates the sequence flow of a call cancel when both voice and SMS fail and the system transfers to an in-band or in-channel data transmission method. In one embodiment, dual-tone multi-frequency (DTMF) is the in-band or in-channel data transmission method. In step 1000, the user actuates the call indicator (i.e., presses the call button) to begin a call request. The indicator actuates the appropriate hardware and software in the TMU to commence a call request in step 1002 but, in this example, the call request fails, e.g., where the remote data center does not know to make a MT voice connection and the SMS messages are unable to connect with either the network or the remote center. When this occurs, in step 1004, the TMU knows to switch into a failsafe mode by communicating using a secondary network to the remote center. In particular, the IVR, knowing that the call requires DTMF since the call arrives on a dedicated number in step 1004, sends the DTMF transmit code in step 1006. The receipt of the DTMF transmit tone at the TMU initiates the transmission of information via DTMF in step 1008.

The user indicates the end of the call by a second actuation of the call indicator in step 1010. The indicator actuates the appropriate hardware and software in the TMU to commence a call cancel and communicates through the network to the remote center of the service provider that the call from the vehicle is ending in step 1012. The network acknowledges the call termination request back to the TMU in step 1014. The TMU, in step 1016, terminates the call to the remote center and voice communication terminates to allow the operator to provide service to another customer. The end of the call, indicated in the last line of FIG. 10, causes the operator to receive a message indicating that the call was ended by the user. The agent can be notified, upon receipt of the call cancel report from the TMU to the remote center, that the customer has requested an end of call. This gives the agent the notification slightly before the call will actually end, resulting in a lower risk of operator confusion.

Figure 11:
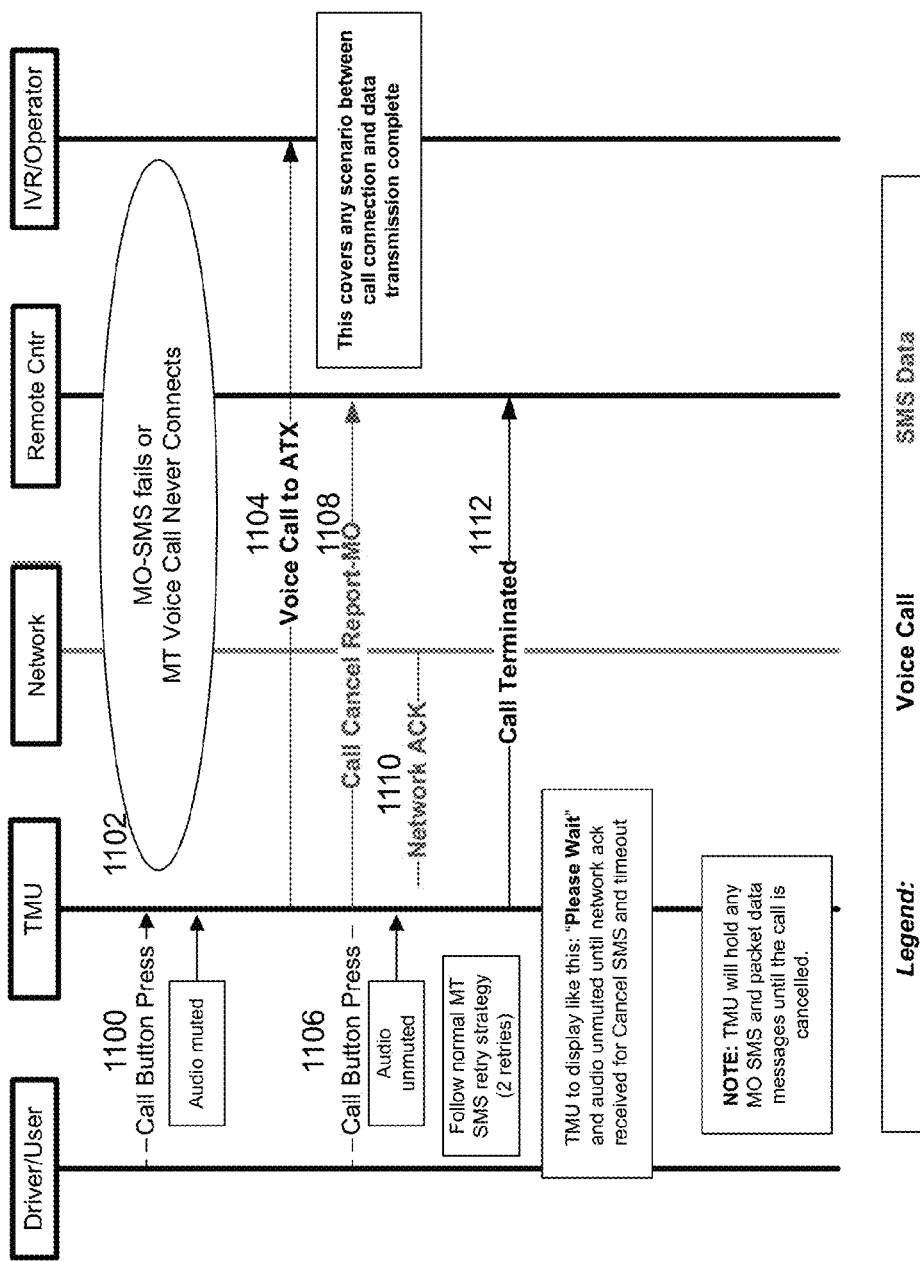
FIG. 11 is a communication transfer timeline diagram illustrating an exemplary embodiment of how yet a further type of call cancellation is handled.

The exemplary process of the invention shown in FIG. 11 illustrates the sequence flow of a call cancel when both voice and SMS fail and the system transfers to a dual-tone multi-frequency (DTMF) call but before any data transfer occurs. In step 1100, the user actuates the call indicator (i.e., presses the call button) to begin a call request. The indicator actuates the appropriate hardware and software in the TMU to commence a call request in step 1102 but, in this example, neither the voice nor the SMS messages are able to connect with either the network or the remote center. When this occurs, in step 1104, the TMU knows to switch into a failsafe mode by communicating using a secondary method to the remote center. In particular, the TMU starts communication to the remote center that a call from the vehicle is under the DTMF scheme by dialing a number dedicated to DTMF calls. In step 1106, however, the user actuates the call indicator for a second time, thereby indicating that the call should be cancelled. The indicator actuates the appropriate hardware and software in the TMU to commence a call cancel and communicates through the network to the remote center of the service provider that the call from the vehicle is ending in step 1108. The network acknowledges the call termination request back to the TMU in step 1110. The TMU, in step 1112, terminates the call to the remote center and voice communication terminates to allow the operator to provide service to another customer. The end of the call, indicated in the last line of FIG. 11, causes the operator to receive a message indicating that the call was ended by the user. The agent can be notified, upon receipt of the call cancel report from the TMU to the remote center, that the customer has requested an end of call. This gives the agent the notification slightly before the call will actually end, resulting in a lower risk of operator confusion.

Figure 12:
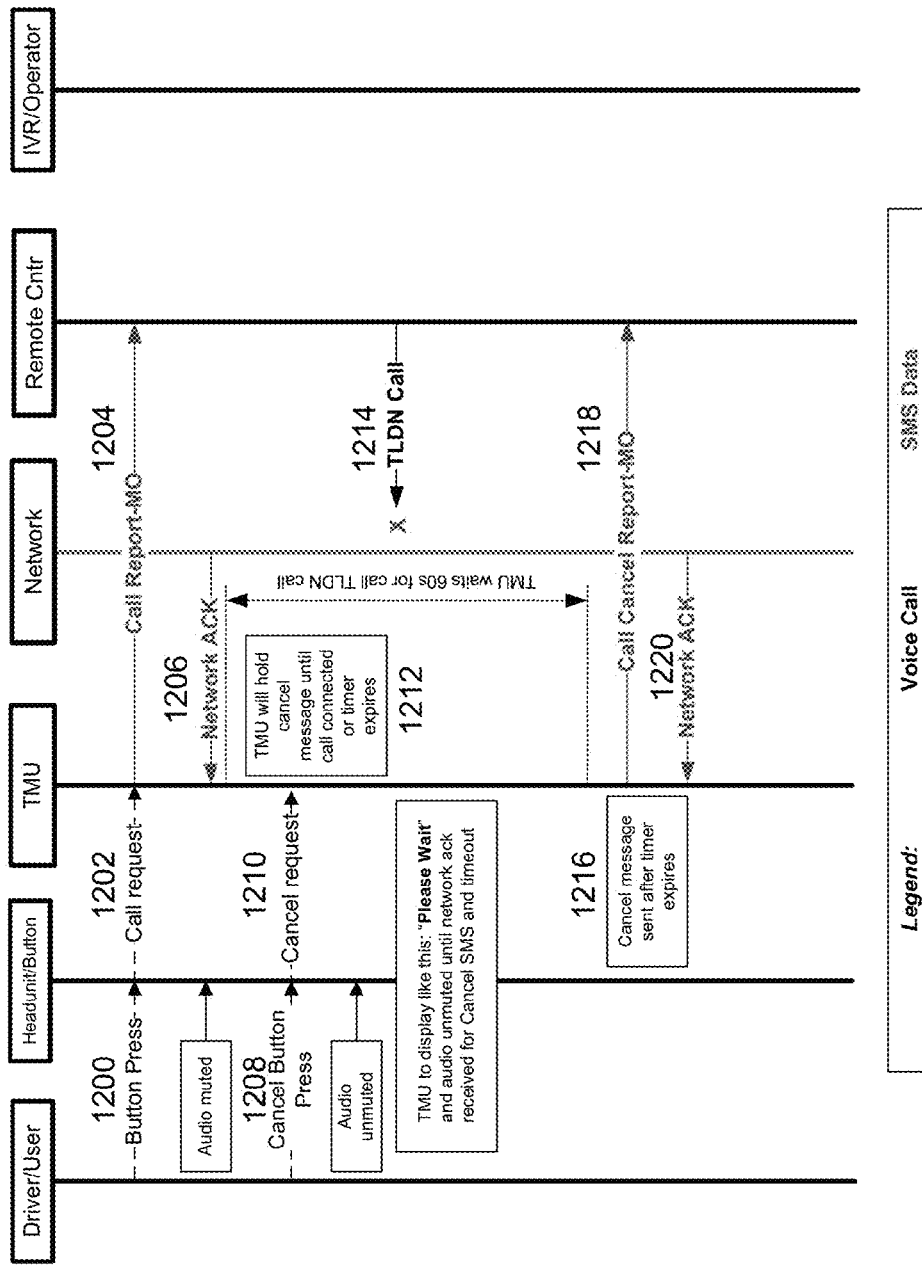
FIG. 12 is a communication transfer timeline diagram illustrating an exemplary embodiment of how yet an added type of call cancellation is handled.

The exemplary process of the invention shown in FIG. 12 illustrates the sequence flow of a call cancel when all connections measures to the vehicle fail. In step 1200, the user actuates the call indicator (i.e., presses the call button) to begin a call request. The indicator actuates the appropriate hardware and software in the TMU to commence a call request in step 1202. The TMU communicates through the network to the remote center of the service provider that a call from the vehicle is incoming in step 1204 and the network acknowledges the call request back to the TMU in step 1206. To have the call end at this point, the user actuates the call indicator for the second time in step 1208. The indicator actuates the appropriate hardware and software in the TMU to commence a call cancel in step 1210. In step 1212, the TMU holds the cancel message call until the call from the remote center is connected or after a pre-defined timer expires. In this example, the remote center, in step 1214, makes the call to the TMU but it does not connect on the initial or subsequent retries (retries not shown)—indicated by the "X." After waiting for the call from the remote center more than the pre-defined amount of wait time, in step 1216, the TMU cancels the message from the second actuation in step 1208. The communication does not stop here because the operator does not know that the user cancelled (in step 1208) the first call from step 1200. Accordingly, the invention provides active notice of cancellation by having the TMU commence the call cancel and communicate through the network to the remote center that the call from the vehicle is ending in step 1218. The network acknowledges the call termination request back to the TMU in step 1220. The agent can be notified, upon receipt of the call cancel report from the TMU to the remote center, that the customer has requested an end of call. This gives the agent the notification slightly before the call will actually end, resulting in a lower risk of operator confusion. An advantage of the present method is that the system is notified of the cancel. Since the system is notified of the cancel, an agent or IVR is never assigned since the MT call had not yet connected. Hence, this method uses less resources to accomplish the cancel by avoiding the assignment of an agent or IVR to a canceled connection.

The processes of the invention as outlined above all have the TMU follow a pre-defined set of communications call cancel and termination rules in the invention. While these rules are listed in order here, this list is not to be construed as having to follow the rules only in this exemplary order. First, the TMU is required to send Call Cancel Report SMS messages after voice has been connected. Second, the TMU disconnects the voice call after the network acknowledgement has been received indicating that the Call Cancel Report SMS was successfully transmitted. Third, the TMU holds any MO-SMS and packet data message until the call is cancelled. The TMU displays a "Please Wait" message upon reception of the network acknowledgement of the call-cancel trigger (e.g., button press) that the Call Cancel Report SMS has been received. The "Please Wait" message is removed when the SMS network acknowledgement is received or the call cancelation process is aborted (e.g., a call upgrade occurs). The TMU follows a predefined MO-SMS retry strategy for the Call Cancel Report SMS. If the network acknowledgement is not returned after sending the SMS Report message a pre-defined number of retries and after a pre-defined network expire time (T_NETWORK- _EXPIRE) has expired, the TMU terminates the voice call. When a customer cancels a call, the TMU returns audio control to the action device (e.g., the button or the head unit). For call cancellations that occur during DTMF, the TMU still sends the Call Cancel Report via SMS. When a cancellation occurs prior to the voice call being connected and the voice call does not connect within a pre-defined time (T_VOICE), the TMU then sends a Call Cancel Report SMS. If an upgrade to an ACN occurs during call cancellation, the TMU ignores the Call Cancel Report SMS and sends the ACN after the voice call has is connected.

Unification of Service Channels

The dynamic system of the invention, capable of sending communications across various different technologies and data formats, is a significant improvement over single channel communications. One benefit of this system unifying communications channels is the ability to take information from one source and to provide to the customer in multiple different ways that gives a diverse communications output and a level of service not experienced before. The following example illustrates the significant benefit of the unified communication processes of the invention. For this example, it is assumed that the vehicle is involved in an accident (i.e., an ACN was triggered). Without the driver taking active steps, the only communication able to have occurred in the past from the vehicle to the outside world was the ACN sent to a service provider. Once the ACN was received, the service provider would take whatever actions the service provider was obligated to perform in such an event. By leveraging all of the various parallel forms of communication provided by the invention, however, many other avenues of communication now become possible.

The invention provides each user with the ability to set a personal profile. This profile can be set up through interaction with an operator at the service provider's call center. A more efficient process of the invention, however, provides a web interface to the user, the interface being programmed to receive information from the user detailing which actions to be taken when different circumstances occur. In the example of the vehicle accident, the user is able to predefine any different action and the following set of different actions to be taken by the service provider is given as an example when a father/husband has an accident:

1) place a phone call from a call center operator to wife;
2) send a text message to each of user's children;
3) send a message to the provider of the television signal in the home to display, upon the television, a specific message, such as "Father was involved in an accident, please call mother's cell."; and
4) send an email to the insurance agent informing of the accident and to call the user.

Where, before, only a single action could be taken, with the systems and methods of the invention, a single automated event can cause immediate, parallel communications over (1) a voice channel, (2) an SMS channel, and the Internet by (3) HTTP protocol and (4) email.

Packet Data Upgrade

Telematics communications systems provided before the invention were not able to take advantage of current communication technology that allows both data packet transmission and voice transmission. Current systems, e.g., Code Division Multiple Access (CDMA), are only able to use packet sessions either before or after voice communication, not concurrently. With the retrofitting telematics component 10 of the invention, either the component 10 can be provided with the technology to perform simultaneous voice and data transmission or the component 10 can leverage the user's 3G-capable phone (or other similar or future upgraded technology) to send data and voice concurrently.

The invention utilizes the advancement in wireless communications to enable the transfer of significantly more relevant information to the provider of services prior to the start of actual service delivery. The invention mixes use of both packet and voice channels for telematics before the voice conversation occurs. The packet data and voice may be implemented as VoIP or voice on a "voice channel." In either case, the telematics space is expanded by the invention to significantly improve services by the prompt delivery of additional information. Significantly more data can be delivered to and from the vehicle that is required for service delivery than via in-band modem, DTMF, SMS, or other non-packet session methods.

With the inventive advance, data can be sent from the car at data transmission speeds while the slower voice communication session is just starting. This allows for very rapid information transfer so that the service provider can already have large amounts of relevant data (e.g., vehicle status and diagnostic information) well before the driver has said the first word to the operator.

Criteria-Based Prioritizing

As set forth herein, the invention is able to intelligently and more efficiently handle the different types of calls with the concurrent ability to communicate over different channels at the same time. By setting up priority criteria for the various possible telematics communications, the invention is able to actively change use of the various communications channels as the communication requests arrive in real time.

Each OEM can define their own customized priorities for the various communication types. For example, air bag deployment communication can be defined to have a greater priority over concierge service requests and, in such a case, the latter can be delayed until after the former has been processed. With regard to the exemplary types of calls mentioned above, one possible priority list for incoming calls can be the following:

1. Automatic Emergency Call
2. Panic Alarm Service
3. Manual Emergency Call
4. Stolen Vehicle Locator Service
5. Remote Service Assistance
6. Scheduling Service
7. Information Call The urgency of the transmission is not the only criteria for prioritizing. The size of data to be exchanged can be another criteria for prioritizing the communication transfer. Also, the availability of the channel can be another prioritizing criteria.

Dynamic Vehicle Provisioning

As various service packages become available on the market, it is cost-prohibitive to upgrade vehicles to the most current standards and/or to be able to utilize the newest software or hardware. This is not true for the retrofitting telematics component 10 of the invention. Much like the cable box in a home, when new or additional services are desired, the transportable telematics component 10 of the invention can be easily replaced with an upgraded version. Also, with the ability to communicate via packet or voice, any upgrades of software can be undertaken even while the user is on the handheld 30. The client at the telematics component 10 can have the software easily synchronized on any periodic schedule. By providing this robust system, now the service provider can enable users to pay for any number of service packages in any combination and to have the user only be able to use the services for which the user has paid the subscription.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems and methods. However, the systems and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems and methods as defined by the following claims.

The invention claimed is:

1. A system for allocating communications resources for telematics communications, comprising:
    a service provider;
    a gateway;
    a currently paired mobile communication device:
        having at least first and second communications channels through which communication occurs to the service provider;
        sensing at least one of speed and acceleration of the mobile communication device based on internally provided data;
        detecting changes in at least one the speed and the acceleration of the
        mobile communication device based upon the sensing of the at least one of speed and acceleration by the internally provided data; and
        determining that an event notification is to be sent to the service provider based upon the detected change in the at least one of the speed and the acceleration; and
    a telematics device having at least a third communications channel through which communication occurs to the service provider, at least one of the telematics device and the currently paired mobile communication device:
        determining which of the first, second, and third communications channels is to be used to communicate to the service provider; and
        the respective one of the telematics device and the currently paired mobile communication device sending the event notification to the service provider.

2. The system according to claim 1, wherein the service provider is a remote data center.

3. The system according to claim 1, further comprising a vehicle in which the gateway and the telematics device are installed.

4. The system according to claim 3, wherein the gateway is an in-vehicle mobile-communication-pairing device.

5. The system according to claim 4, wherein the mobile communication device is a cell phone having at least one of a GPS location system and an accelerometer and sensing the at least one of the speed and the acceleration of the cell phone based on data from at least one of the GPS location system and the accelerometer.

6. The system according to claim 5, wherein:
    the cell phone communicates with the gateway;
    the gateway communicates with the telematics device; and
    the cell phone passes the event notification to the telematics device through the gateway.

7. The system according to claim 6, wherein the gateway recognizes the event notification from the cell phone as a crash of the vehicle.

8. The system according to claim 1, wherein:
    the first communication channel is a voice channel;
    the second communication channel is a data channel associated with a consumer data plan;
    the third communication channel is a data channel associated with a dedicated data plan; and
    the third communication channel increases security and likelihood of a successful transmission of the event notification to the service provider.

9. The system according to claim 8, wherein the telematics device initiated a telematics communication between the telematics device and the service provider through the first communication channel of the cell phone, the telematics communication including the event notification.

10. The system according to claim 8, wherein the telematics device initiated a telematics communication between the telematics device and the service provider through the second communication channel of the cell phone, the telematics communication including the event notification.

11. The system according to claim 8, wherein the telematics device initiated a telematics communication between the telematics device and the service provider through the third communication channel, the telematics communication including the event notification.

12. The system according to claim 8, wherein the cell phone instructs the telematics device to initiate a telematics communication between the telematics device and the service provider through the third communication channel, the telematics communication including the event notification.

13. The system according to claim 8, wherein the cell phone sends the event notification to the service provider through the first communication channel of the cell phone.

14. The system according to claim 8, wherein the cell phone sends the event notification to the service provider through the second communication channel of the cell phone.

15. The system according to claim 1, wherein the telematics device:
    initiates a telematics communication between the telematics device and the service provider via a network;
    determines whether a network resource allocation for the telematics communication is still required based upon user intent information; and
    sends a notification of a change in the network resource allocation via a secondary communication channel, the secondary communication channel comprising one of a first link coupled to the gateway, a second link coupled to the telematics device, and a third link coupled to the currently paired mobile communication device.

\* \* \* \* \*